(12) United States Patent
Poletti

(10) Patent No.: US 6,191,568 B1
(45) Date of Patent: Feb. 20, 2001

(54) LOAD POWER REDUCTION CONTROL AND SUPPLY SYSTEM

(76) Inventor: Franco Poletti, 5738 Springgate Place, Sardis British Columbia (CA), V2R 3W5

( * ) Notice: Under 35 U.S.C. 154(b), the term of this patent shall be extended for 0 days.

(21) Appl. No.: 09/482,570

(22) Filed: Jan. 13, 2000

(30) Foreign Application Priority Data

Jan. 14, 1999 (CA) .................................................. 2,259,055

(51) Int. Cl.⁷ .............................. G05F 1/40; H05B 41/38
(52) U.S. Cl. ........................................... 323/268; 315/360
(58) Field of Search .................................... 315/276, 291, 315/297, 307, 360; 363/34, 37; 307/66; 323/268, 265, 235, 237, 282

(56) References Cited

U.S. PATENT DOCUMENTS

| | | |
|---|---|---|
| 4,147,961 | 4/1979 | Elms . |
| 4,189,664 | 2/1980 | Hirschfeld . |
| 4,292,570 * | 9/1981 | Engel ................................... 315/360 |
| 4,431,948 | 2/1984 | Elder et al. . |
| 4,751,398 * | 6/1988 | Ertz, III .................................. 307/66 |
| 4,956,583 | 9/1990 | Lawrence et al. . |
| 4,965,492 * | 10/1990 | Boldwyn .............................. 315/156 |
| 5,327,048 * | 7/1994 | Troy ..................................... 315/240 |
| 5,623,186 * | 4/1997 | Archdekin ............................ 315/276 |
| 5,751,116 | 5/1998 | Thomas et al. . |
| 6,046,549 * | 4/2000 | James .................................... 315/291 |
| 6,081,104 * | 6/2000 | Kern ..................................... 323/268 |

OTHER PUBLICATIONS

*Applications of Zero Voltage Crossing Optically Isolated Triac Drivers*, Motorla Semiconductor Application Note (AN982) No date 1.6–49 to 54 pages.

*6–Pin DIP Zero–Cross Optoisolators Triac Driver Output*, Motorola Semiconductor Technical Data (M03162/D) 1997, 9 pages.

*Operation of a Ballast*, Advance Transformer Inc., 2 pages No date http://www.thelightingcenter.com/advancetransformer/ballastoperation.html.

*Fluorescent Lamp Ballast*, ECEN4517/5017, 2 page Project, Dept. of Electric & Computer Engineering, University of Colorado http:// ece–www.colorado.edu/ ~ecen4517/course _material/project/ballast.html No date.

* cited by examiner

*Primary Examiner*—Adolf Deneke Berhane
(74) *Attorney, Agent, or Firm*—Robert H. Barrigar; Barrigar Intellectual Property Group

(57) ABSTRACT

The invention is a load voltage and power control and supply system for the supply of power to a load for which, over particular periods of time, usually on a daily basis, it is desired to reduce power. The invention has particular application to street lighting systems in which, for a period of several hours during the night (when traffic is minimal and many people are asleep), the luminaires of the lighting system can operate at reduced power. The power control system is able to act as a voltage stabilizer as well as a controlled power reduction system. The power control system may operate the bank of spaced luminaires from a single control location. Moderately reduced power (say a 30% reduction in power) supplied to luminaires does not noticeably diminish the adequacy of the illumination provided. Further, the power control system reduces power in stepwise decrements each of which reduces power by a small amount insufficient to diminish noticeably the ambient illumination.

37 Claims, 11 Drawing Sheets

Fig. 1 - Prior Art
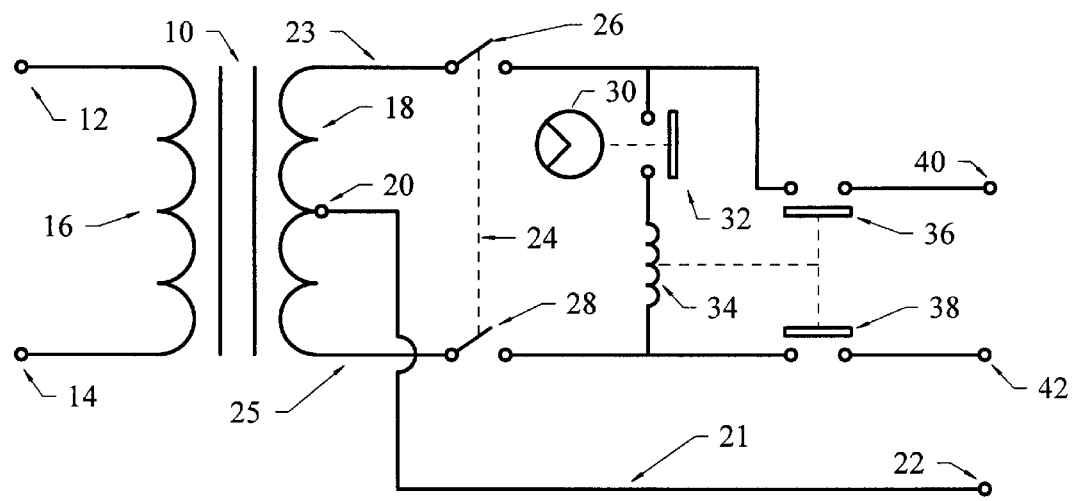
Fig. 7A
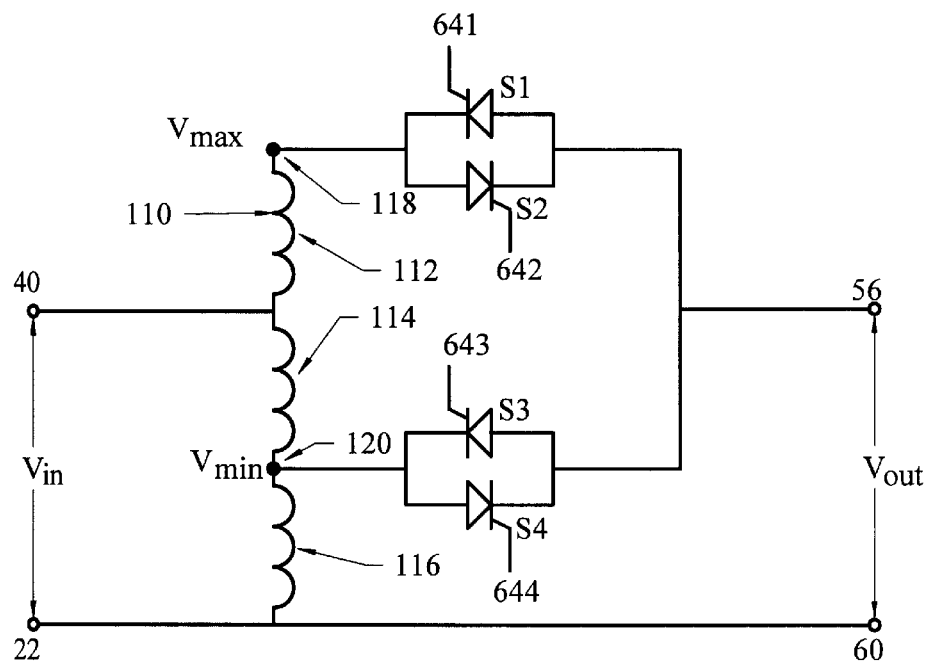

LOAD POWER REDUCTION CONTROL AND SUPPLY SYSTEM

This invention is a combined load power consumption reduction system, voltage stabilizing control system, and power supply system, particularly for controlling the power supplied to street-lighting loads (luminaires) and especially for high-intensity discharge (HID) and fluorescent luminaires.

BACKGROUND OF THE INVENTION

Street lighting systems may be operated by manually operated switches, but more frequently they are operated under the control of a photoelectric cell or timer or a programmed combination of both a timer and a photoelectric cell. In conventional such systems, steady-state power is applied to the load at full rated voltage.

Experience shows that street lights may operate at power levels substantially below rated power levels without causing a perceptible decline in the illumination provided. While during peak night-time traffic hours it may be desirable to operate the street lamps at full rated voltage, nevertheless in the middle night-time hours when traffic intensity is low and many people are asleep, municipalities for economic reasons may choose to operate street lamps at reduced power levels. Satisfactory control circuits to permit reduced power level operation (sufficient to provide satisfactory off-peak illumination) to occur automatically, subject to various overrides to deal with particular circumstances, are not readily available.

SUMMARY OF THE INVENTION

The invention is a load voltage and power control and supply system for the supply of power to a load for which, over particular periods of time, usually on a daily basis, it is desired to reduce power. The invention has particular application to street lighting systems and similar systems in which, for a period of several hours during the night (when traffic is minimal and many people are asleep), the lighting system can operate at reduced power. The system according to the invention is able to act as a voltage stabilizer as well as a controlled power reduction system.

The power control system according to the invention may operate the load from a single control location, even if the load is spatially dispersed, as in the case of a multiplicity of luminaires. Experience shows that moderately reduced power (say a 30% reduction in power) supplied to such luminaires does not appreciably diminish the adequacy of the illumination at such reduced power levels as compared with full-power illumination.

Further, the power control system is able to reduce power in stepwise decrements each of which reduces power by a small amount insufficient to diminish noticeably the ambient illumination.

In one aspect, the invention provides a power control unit for connection between a source of power and a load, and for control of power supplied to the load, comprising the combination of the following components:

1) a power supply circuit connectable to the power source for providing an output current at controllably variable output voltage levels over a range of voltage values (thereby to be able to effect a stepwise reduction in output voltage from the high end to the low end of the range);
2) a driver circuit (which may be integral with the power supply circuit) for driving the power supply circuit so as to set the output voltage level at which the output current is for the time being supplied to the load; and
3) a controller (preferably a microcontroller) for controlling the driver circuit to drive the power supply circuit to provide output power at a voltage set by the driver circuit in response to the controller. At the high end of the voltage range, the controller provides a signal to the driver circuit that compels the driver circuit to set a high output voltage level for the power supply circuit output so as to supply power at a set high-power setting. This high-power setting persists for a period of time $T_{Hi}$ starting upon the occurrence of a high-power start condition, and ending upon the occurrence of a high-power end condition. At the low end of the voltage range, the controller provides a signal to the driver circuit that compels the driver circuit to set a low output voltage level for the power supply circuit output so as to supply power to the load at a set low power for a later period of time $T_{Lo}$ starting upon the occurrence of a low-power start condition and ending upon the occurrence of a low-power end condition.

The controller in operation may transmit a sequence of control signals to the driver circuit to cause the driver circuit to (i) set the high output voltage level so as to supply power at the set high power setting for the period of time $T_{Hi}$, (ii) set the low output voltage level so as to supply power to the load at the set low power for the period of time $T_{Lo}$, and (iii) set a series of diminishing voltage levels during a transition period between time periods $T_{Hi}$ and $T_{Lo}$. The time periods $T_{Hi}$ and $T_{Lo}$ may be recurrent, for example diurnally recurrent in the case of street lighting systems.

During the transition period following time period $T_{Hi}$ and preceding time period $T_{Lo}$, the controller controls the driver circuit to set a series of output voltage levels for the power supply circuit diminishing controllably from the set high output voltage level to the set low output voltage level in accordance with selected characteristics of the load. Preferably the voltage is stepwise decremented from rated load voltage to a target reduced voltage level. In the case of a load constituting a bank of luminaires, the aforementioned selected characteristics may be, for example, (i) the maximum voltage drop that a luminaire may tolerate before snuffing out (which value may vary with the type of luminaire and the voltage prevailing when the voltage reduction occurs) and (ii) the maximum voltage reduction that can be effected without causing a noticeable reduction in illumination by the luminaires. This latter will be especially important in street lighting situations, because a noticeable reduction in illumination may impair vision or cause alarm to motorists passing by the luminaires. Accordingly, each sequential voltage reduction, proceeding from full rated voltage to target reduced voltage, will generally be selected to be less than the lesser of values (i) and (ii) above. The stepwise reductions may be selected to be some specified percentage of the previously prevailing voltage level.

The power control unit may advantageously including a sensor of supply current to the load, to which current the controller is responsive. During the transition period and after the supply current to the load has stabilized, the controller provides the next succeeding stepped output voltage level reduction.

The power control unit may include an autotransformer whose output is supplied to the load and whose output voltage level is variable in response to the driver circuit.

The power supply circuit may include a compensating transformer whose secondary winding is connected in series with the load and whose primary winding is connected between the center tap of the autotransformer and a variable tap on the autotransformer winding. The autotransformer is connected so that the secondary winding voltage is added to the output voltage of the autotransformer to constitute the output voltage level for supply to the load.

The driver circuit may include a servomotor connected to the variable tap on the autotransformer winding and responsive to the controller. In this case, the voltage applied to the primary winding of the compensating transformer is taken from the variable tap, whose position on the autotransformer winding is controlled by the servomotor in response to the controller.

The power supply circuit may in an alternative embodiment include an autotransformer whose winding is tapped at a first output tap that provides the high output voltage and also tapped at a second output tap that provides the low output voltage. Preferably one input terminal of the autotransformer is located at a tap positioned between the said output taps, and the other input terminal of the autotransformer is connected to the zero voltage point of its winding and to a second output terminal for connection to the other terminal of the load. The driver circuit may in such case comprise two pairs of inverse parallel-connected silicon-controlled rectifiers, each pair connected between a discrete tap and a first output terminal for connection to a terminal of the load. The silicon-controlled rectifiers respond to control by gate signals provided by the controller so as to supply output current to the load at controlled output voltage levels from the high to the low output voltage levels and to any set transitional output voltage levels.

In a further alternative embodiment, the power supply circuit includes an autotransformer whose winding is tapped separately at a first output tap corresponding to the high output voltage level, and at a second output tap corresponding to the low output voltage level, and by at least one further tap located at a point intermediate the first and second taps. This last tap corresponds to a transitional output voltage level intermediate the high output voltage level and the low output voltage level. The driver circuit in this case preferably comprises a set of triacs, each such triac being connected between a discrete tap and the load. The triacs individually respond to control by gate signals provided by the controller so as to supply output current to the load at a selected one of the high, the low, and any of the transitional output voltage levels.

SUMMARY OF THE DRAWINGS

FIG. 1 is a circuit diagram of a conventional photoelectric cell-controlled power supply circuit suitable for use with a street lighting system according to the invention.

FIG. 7A (on the same sheet as FIG. 1) is a circuit diagram illustrating a further embodiment of a power supply circuit that can be incorporated into the system of FIG. 2, employing silicon controlled rectifiers in conjunction with an autotransformer to supply a controlled output voltage to the load, in accordance with the present invention.

DETAILED DESCRIPTION

In this description, reference will be made to street light systems and luminaires for use with such systems, as such is the expected context for the principal implementation of the invention. However, the power control and supply system according to the invention has application, with appropriate modifications where needed, to other power supply applications in which a reduced supply of power is required over a specified time interval, particularly a specified periodically repeating time interval.

Figure 2:
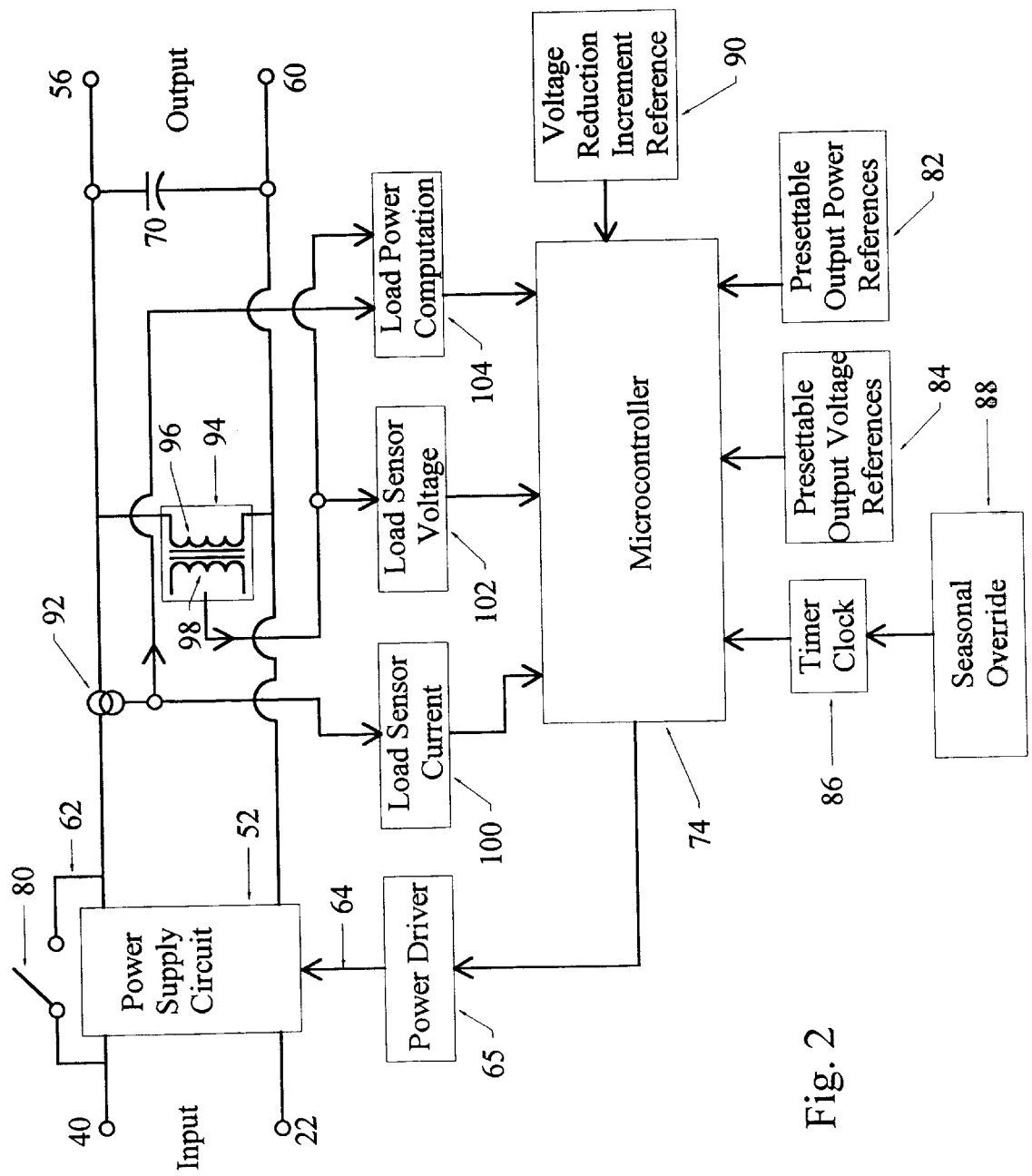
FIG. 2 is a schematic block/circuit diagram illustrating in generalized configuration an embodiment of the power control and power supply circuit and system according to the invention.

FIG. 1 is a schematic circuit diagram illustrating a suitable supply circuit of conventional design for a load power control device pursuant to the invention, e.g. for controlling electric power for street lighting. (Other such suitable circuits exist; the one chosen is exemplary.) In other words, the circuit of FIG. 1 is connected between mains high-voltage supply and the load power control circuit, e.g. street lighting control circuit, of the invention, one embodiment of which latter is illustrated in FIG. 2. FIG. 1 does not per se depict any unconventional circuit arrangement, but rather represents a supply circuit that is suitable for use with the inventive control system. FIG. 1 includes an ambient light-responsive control device to control the availability of supply power, and thus is particularly suitable for street-lighting control.

Referring to FIG. 1, two-phase mains line voltage is supplied across terminals 12 and 14 between which the primary winding 16 of transformer 10 is connected. The secondary winding 18 of the transformer 10 is center-tapped at 20 to provide a common (in this case, neutral) supply line 21 ending in common (neutral) terminal 22. The winding relationship between transformer winding 16 and 18 is selected to provide oppositely polarized operating voltages on supply lines 23 and 25, respectively, relative to common line 21. Supply lines 23, 25 provide supply power to the power control device (e.g. of FIG. 2) via supply terminals 40, 42 respectively relative to common terminal 22. Note that power may be taken across as many as three pairs of terminals, viz (40 and 42), (40 and 22), and (42 30 and 22).

A manually operated breaker switch 24 comprising interlocked breaker contacts 26, 28 is available to interrupt the supply circuit to the control apparatus to be described. Breaker switch 24 is series-connected in supply lines 23, 25 and when open, prevents current flow to the output terminals 40, 42 for supply lines 23, 25.

A photoelectric cell 30 reacts to changes in ambient light and closes associated photocell contact 32 when ambient light declines to a pre-set threshold level. When contact 32 closes, then (assuming breaker contacts 26, 28 are closed), current flows through relay coil 34 which, when actuated, closes normally open contacts 36, 38, respectively, thereby providing supply voltage at terminals 40 and 42 (relative to common terminal 22). In operation, in daylight, normally open contacts 36, 38 remain open, so that there is no supply power available from terminals 22, 40, 42; when evening arrives and ambient light declines below the pre-set threshold level for photocell 30, contacts 32 close, causing relay coil 34 to close relay contacts 36, 38, thereby making available supply power at terminals 22, 40, 42.

When dawn breaks and ambient light returns to an adequate threshold level of brightness, contact 32 opens, resulting in the cessation of current supply to relay coil 34, and as a consequence, contacts 36 and 38 re-open, interrupting the current supply via supply terminals 22, 40, 42 to the load power control circuitry to be described below with reference to FIGS. 2 ff.

In FIG. 1, contact 32 is shown driven by a photoelectric cell 30, but it is to be understood that the master control for the supply circuit may, instead of a photoelectric cell, be a timer or other suitable control element (including a manually operable switch).

FIG. 2 is a schematic block/circuit diagram of the gross structure of load power control circuitry for load power control pursuant to the present invention. Input supply terminals 40 and 22 for the diagram of FIG. 2 appear as the output supply terminals for the circuit of FIG. 1. FIG. 2 is schematic, borrowing some elements of conventional circuit diagram depiction and some elements of block diagram or flowchart depiction, for simplification of the discussion. Further, although FIG. 1 illustrates output terminals for two opposed polarities and a neutral, FIG. 2 ignores one of the polarities and shows terminals for only one polarity and the neutral as its input. For simplification, FIG. 2 presents only one "live" line, it being understood that what is illustrated in FIG. 2 can be extrapolated into a complete circuit diagram by any competent circuit designer, with the aid of the following description.

Portions of FIG. 2, particularly what is seen in the upper part of the diagram, for convenience of illustration, are presented in conventional electric circuit diagram format. But as mentioned, the circuitry of FIG. 2 is incomplete; not all of the common line connections for various of the operating elements are shown and instead a flowchart approach to the various control loops etc. is taken. It is to be understood that appropriate circuit completion connections will be arranged as required to give structural and operational effect to the elements of FIG. 2 to be described.

The circuit of FIG. 2 can be implemented using analog circuit means, in which case operational amplifiers or equivalent analog logic devices to establish references, comparisons and control signals may be advantageous. Further, it is possible to substitute alternative system components for various of those appearing in FIG. 2, as will be apparent to those skilled in circuit design. However, it is convenient to implement the control aspects of the circuit of FIG. 2 using a microcontroller and related digital circuitry. For convenience, such digital control implementation is embodied in the diagram of FIG. 2 in flowchart representation. It is to be understood that where necessary, appropriate analog/digital converters will be provided by the circuit designer to implement the design to be described.

The conventional circuit presentation portion of FIG. 2 establishes that input voltage and current from input terminals 40, 22 flows to output terminals 56, 60 via an intervening load power supply circuit 52 connected therebetween.

The load power supply circuit 52 is driven by a power driver 65 under the control of microcontroller 74 acting in response to certain reference, pre-settable and feedback inputs, as designed. Among these reference settings may be:

1) a specified time or time interval during which reduced output power is to be provided, as set by a timer clock 86;
2) seasonal reference settings, if desired;
3) a setting for the limit of stepwise incremental increases or decreases in output voltage, if such adjustment is needed, as by voltage reference settings 84;
4) a setting for the time of day at which the load power control circuit becomes operational and/or non-operational (if desired in addition to the control provided by the circuit of FIG. 1, and possibly subject to overriding or complementary other inputs, such as
5) a seasonal override setting 88; and
6) control over the amount (percent, or absolute value) of power reduction required during reduced power operation of the control circuitry, as by output power reference setting 82.

Some of the reference settings are time settings, such as the clock time or time interval setting and the seasonal override setting. Others are value settings, such as the reduced load power setting (which may be a specific load power selection or a specified percentage of supply power or may be expressed in terms of load supply voltage or current). The load power supply circuit 52 may be bypassed if desired by closing normally open manually operable switch 80 connected across the power supply circuit 52. The bypass operation can be automatically performed in the event of overload, such as by a short circuit or other failure (in which event, a circuit breaker, fuse or the like not illustrated in FIG. 2 will open the input power supply to circuit 52, thereby eliminating any short-circuit problem that may be internal to the power supply control system according to the invention; on the other hand, if the short circuit is in the load, the usual mains supply circuit breaker will open upstream of the terminals 40, 22).

Some or all of the settings described above may, instead of being made available to the operator as dial or switch settings or the like, be incorporated into the operating software for the microcontroller 74.

The microcontroller 74 may be any suitable microcontroller available in the market, having adjustable pre-settable time and value reference inputs and responsive also to feedback for parameter comparison purposes. As mentioned, such inputs and control response thereto may be software-effected rather than hardware-effected, depending upon the microcontroller selected. It is up to the designer to decide how many different inputs should be provided to the microcontroller 74, having due regard to the need for some types of output loads to be precisely regulated, in turn requiring a number of different inputs in order to provide such precise regulation; whereas for other types of loads, a coarser, simpler approach to load power control may be quite satisfactory. Further, some designers or their customers may not wish to provide, for example, a seasonal override on the duration of the reduced power operation period, in which case the seasonal override setting 88 may be omitted.

In the system illustrated in FIG. 2, the microcontroller 74 is shown as responding to pre-settable output load power references 82, pre-settable output voltage references 84, a timer clock 86 and a voltage reduction decrement reference 90. Such reference settings may be effected by suitable hardware settings on trim pots or dip switches, for example, or by means of software parameter selections. The microcontroller 74 is also responsive to three feedback signals, namely a load current signal 100, a load voltage signal 102 and a load power computation signal 104. As mentioned, suitable analog/digital converters (not shown) would be routinely provided to enable the microcontroller 74 to operate digitally on digital values obtained by conversion of analog measurements.

The pre-settable output power references 82 would typically be one or two reference signals—one for full rated power supplied to the load (this reference may not be necessary for some control applications), and the other for a reduced load power level chosen by the user of the power supply system. Instead of establishing a specific reduced output load power, the user may select instead a given power reduction expressed as a percent—for example a 30% power reduction from rated power, or as the case may be.

The pre-settable output voltage references 84 can be two in number, namely a rated nominal voltage for full power delivered to the load to be connected across output terminals 56 and 60, and a reduced voltage reference that corresponds to the reduced output power desired. Alternatively, the latter reference can be supplied as a reduced output power reference 82.

The timer clock 86 may establish both the onset and the duration of the period of time during which reduced power will be provided to the load; alternatively, the onset can be measured from a start time determined by the photocell 30 of FIG. 1. The timer 86 and/or the microcontroller 74 may receive additional inputs such as a seasonal override input 88 that would on a seasonal basis vary either the duration of the reduced power period or the timing of its onset—for example, input 88 could take into account the changeover from standard time to daylight saving time, and could take into account the fact that in the winter months, dusk arrives earlier than in the summer months, although for some situations it would be expected that this latter aspect of the control of the power supply would primarily be governed by the photocell circuitry of FIG. 1 rather than by the program circuitry of FIG. 2. Further reference inputs (not shown) to the timer 86 and/or microcontroller 74 might include, for example, a reset signal to reset the time if there has been an electrical power interruption, etc.

Reduced power output to the load may be effected by maintaining load current relatively constant while reducing load voltage. For some types of load, for example high voltage discharge lamps, it is not possible to reduce applied load voltage in a single reduction of, for example, 30% while maintaining illumination—the lamps cut out in response to such large voltage changes and have to be restarted. So instead of effecting a 30% (say) voltage reduction in one step, the microcontroller 74 is selected, designed or programmed to provide a series of decremental voltage reductions, each one of which is sufficiently small that the luminaires do not snuff out; no interruption of illumination occurs (in the case of a luminaire load). Because the properties of luminaires and the like may vary from type to type and brand to brand, the magnitude of the voltage reduction decrement may have to be varied from one situation to another. For that purpose, a voltage reduction decrement reference input 90 can be made available to the microcontroller 74. This reference can of course be omitted if only one type of lamp will be used and if the microcontroller is set or programmed to reduce voltage by decrements that such lamps will tolerate.

Further, because the particular lamps or other loads connected to the output terminals 56, 60 may have variable response to any particular load voltage change (and particularly, may have a varying response time required to regain stability following a voltage change) it is important that any decremental reduction proceed only if the load current has regained sufficient stability. For that purpose, and also to enable the microcontroller 74 to stabilize the load voltage during steady-state operation, suitable feedback signals, illustrated in FIG. 2 as constituting load current 100, load voltage 102 and load power computation 104, are provided to microcontroller 74 for comparison with target values. For example, the microcontroller 74 compares actual load voltage with the target voltage signal established for the time being (as determined initially by the signals received from references 84, 90, and as re-set as the load voltage declines through a series of decremental steps). In operation, the microcontroller 74 maintains a particular interim target voltage level, sending a correlated output voltage control signal to the power driver 65 accordingly, for as long as the differential between that target voltage level and the voltage level feedback signal 102 exceeds some pre-set threshold. Once the voltage differential drops below that threshold level, and after load current has stabilized at the interim target voltage established by the microcontroller 74, the microcontroller 74 responds by setting a fresh interim target voltage that is lower by the amount of the pre-set decrement than the immediately preceding target voltage.

Furthermore, if there has been a power interruption or some other unusual circumstance on the line, the feedback reference signals 100, 102 and 104 can govern the operation of the microcontroller 74 suitably; if there has been only a short interruption of supply power at input terminals 40, 22, it may be possible to resume supplying power to the load without going through a fresh start-up cycle for the load, because in that event the probability is that the luminaires will not have been extinguished. On the other hand, if the power interruption (say) at the input terminals 40, 42 has existed for an appreciable period of time (more than about 10 msec, in the case of HID luminaires, for example), the luminaires (say) will have turned off and in that event it will probably be necessary to go through another warm-up cycle in order to have the luminaire load connected across output terminals 56, 60 restart and regain steady-state operation. Typically, in such latter circumstances, the luminaires are restored to operation at full rated power before any voltage reduction occurs to re-establish the reduced power mode of operation. Accordingly, the microcontroller responds in either a "resume operation" control mode or a "warm-up" control mode, depending upon whether the luminaires are on or off. As mentioned, the "warm-up" control mode will typically require the furnishing to the luminaires of full rated voltage, following which, if the pre-set time interval for the reduced-power mode of operation has not yet expired, the microcontroller 74 can repeat the decremental voltage reduction steps previously described.

In the following discussion and in the claims, the conditions, as defined by the values of the reference, pre-settable and feedback inputs discussed above, under which the microcontroller 74 is programmed to set a high output voltage level so as to supply power at a high power setting (typically full rated power) are referred to as high power start conditions. The conditions, as defined by the values of those inputs, under which the microcontroller 74 is programmed to set an output voltage level differing from the high output voltage level so as to stop supplying power at the set high-power setting are referred to as high-power end conditions. Similarly, the conditions, as defined by those inputs discussed above, under which the microcontroller 74 is programmed to set a low output voltage level so as to supply power at a set low (reduced) power setting are referred to as low-power start conditions, and the conditions under which the microcontroller 74 is programmed to set an output voltage level differing from the low output voltage level so as to stop supplying power at the set low-power setting are referred to as low-power end conditions. The period of time between the occurrence of a high-power start condition and the next high-power end condition is referred to as a high-power period, sometimes abbreviated as $T_{Hi}$, and, similarly, the period of time between the occurrence of a low-power start condition and the next low-power end condition is referred to as a low-power period, sometimes referred to as $T_{Lo}$.

Under normal operating conditions, following a high-power period $T_{Hi}$ and before a low-power period $T_{Lo}$ is due to start, a transition period is provided during which the microcontroller 74 in response to the inputs discussed above sets a series of voltage levels diminishing controllably from the set high output voltage level to the set low output voltage level in accordance with selected characteristics of the load. For example, the duration of the transition period may vary depending upon ambient temperature, age and condition of the luminaires comprising the load and other factors.

Figure 6:
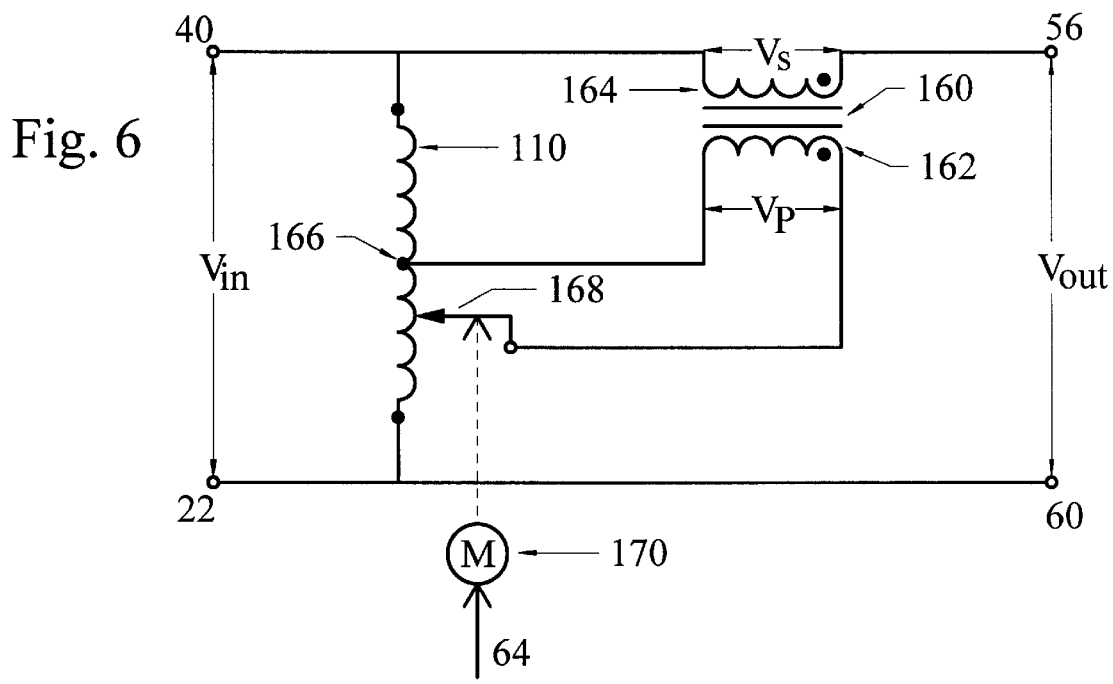
FIG. 6 (on the same sheet as FIGS. 3A and 3B) is a circuit diagram illustrating a second embodiment of a power supply circuit that can be incorporated into the system of FIG. 2, employing a servo-motor in conjunction with an autotransformer to supply a controlled output voltage to the load, in accordance with the present invention.
Figure 5A:
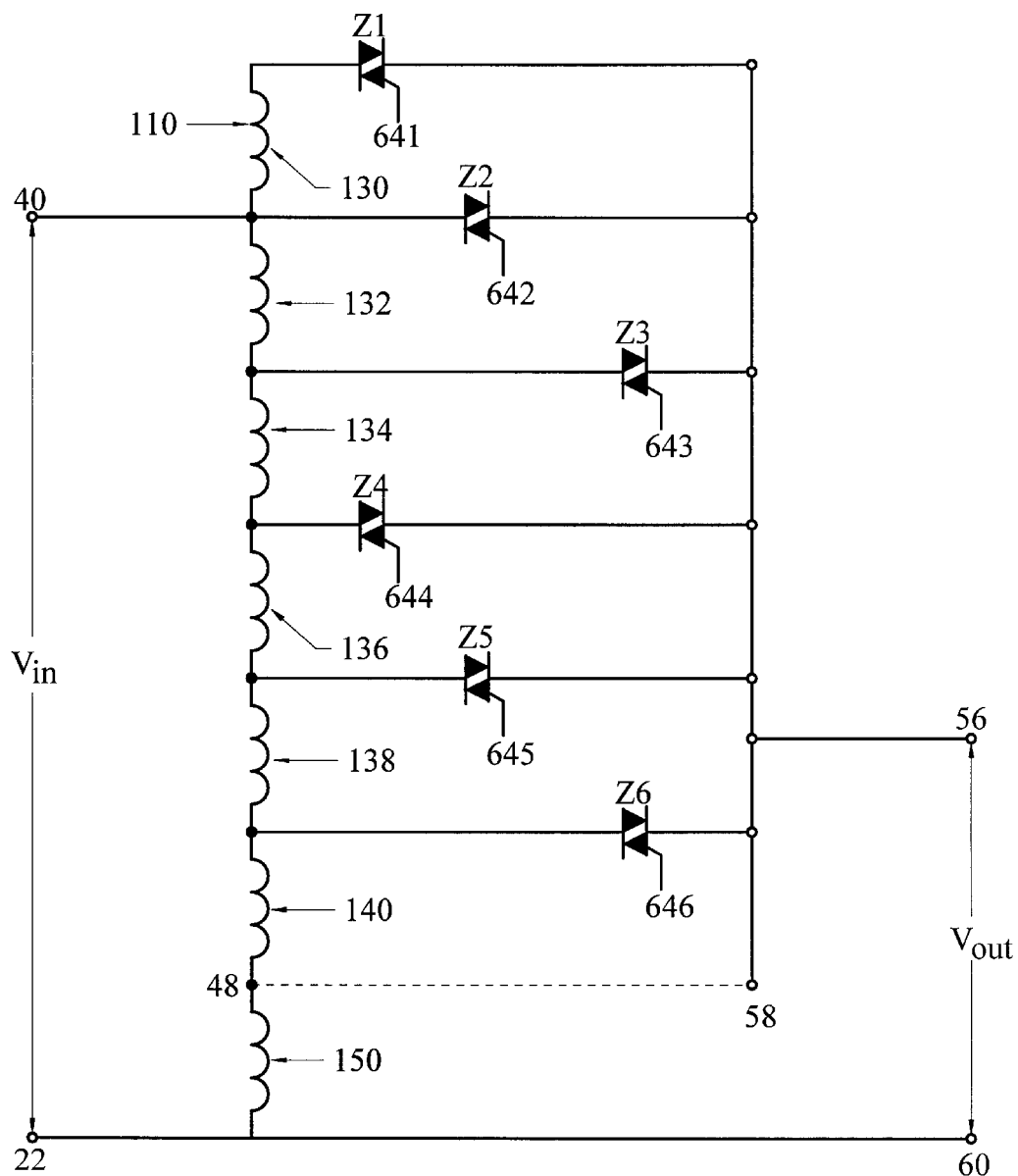
FIG. 5A is a circuit diagram illustrating an embodiment of a power supply circuit that can be incorporated into the system of FIG. 2, employing triacs in conjunction with an autotransformer to supply a controlled output voltage to the load, in accordance with the present invention.
Figure 5B:
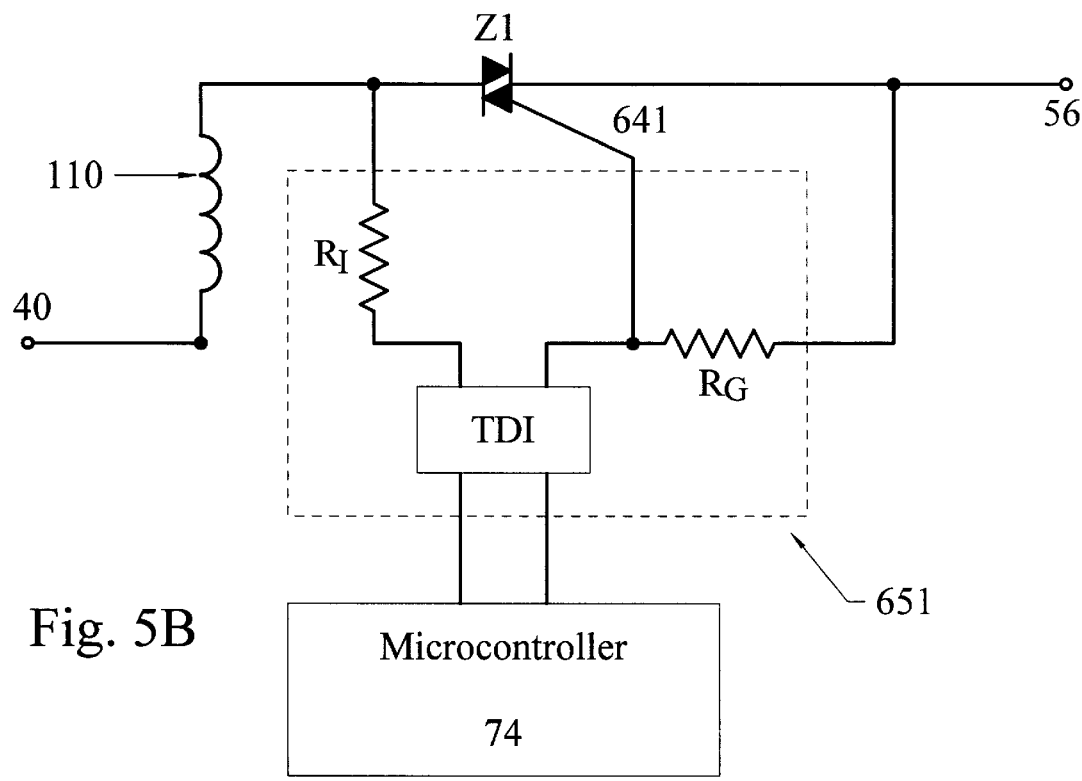
FIG. 5B is a circuit diagram illustrating a portion of power driver circuit suitable for use with the power supply circuit of FIG. 5A.

The microcontroller 74, in response to each of the inputs already discussed and any others that may be desired by the designer, provides a drive signal to power driver 65, which latter may be a driver circuit suitable for supplying the gate control voltages at gate terminals 641, etc. of the various silicon-controlled rectifiers S1, etc. illustrated in FIG. 7A, or the gate control voltages at gate terminals 64A, etc. of the various for the triacs Z1, etc. illustrated in FIG. 5A. Or the power driver 65 may instead provide a control signal to servo-motor 170 of FIG. 6. Other types of power driver may be designed that would be suitable for adjusting output voltage and power in a suitable power supply circuit. In each case, if a digital microcontroller is chosen, it will be necessary to convert the digital signal to analog and typically also to amplify it in some suitable way (e.g. by power amplifier or relay) so that a suitable power drive circuit signal 64 may be provided. The preferred design choices of output power supply circuit 52 established in accordance with the present invention are those illustrated in FIGS. 5A, 6 and 7A (or 7B), but other choices might be entirely suitable for various loads, in the designer's preference. Suitable power driver circuits for power supply circuits illustrated in FIGS. 5A and 6 are illustrated in FIGS. 5B (for the FIG. 5A power supply circuit) and FIGS. 11 and 12 (for the FIG. 6 power supply circuit). No power driver circuit shown for the power supply circuit illustrated in FIG. 7A (or 7B), but if necessary a power amplifier or relay may be provided.

Note that some of the elements shown as discrete blocks in FIG. 2 (e.g., load power computation block 104) may in fact be incorporated into the microcontroller 74. Further, as mentioned, some of the elements shown as discrete blocks in FIG. 2 (e.g. selected ones of the blocks 82, 84, 86, 88) may operate merely as reference values in software governing the operation of microcontroller 74. So, for example, instead of generating a seasonal override 88 as a discrete input to either the timer clock 86 or the microcontroller 74, that seasonal override could be simply a value in a software program governing the operation of the microcontroller 74 in its provision of a given output signal to the power driver 65 at any particular time of any particular day of the year. So it is within the discretion of the designer to use various discrete logic elements in conjunction with the microcontroller 74 or to have the microcontroller 74 itself perform the logical operations under the control of a hard-wired logic circuit or under the control of suitable software, depending upon the particular type of microcontroller chosen and the particular circumstances of the load being regulated.

In the particular system illustrated in FIG. 2, the feedback load current is obtained with the assistance of a current transformer 92 connected between power supply circuit 52 and output "hot" terminal 56, which current transformer 92 provides a load current reading 100 to the microcontroller 74. The load voltage feedback is obtained with the assistance of a transformer 94 whose primary winding 96 is connected across output terminals 56 and 60 and whose secondary winding 98 provides a load voltage signal provided as feedback load voltage input 102 to the microcontroller 74. Further, the load current values and load voltage values obtained from current transformer 92 and transformer 94, respectively, are fed to a load power computation circuit 104 that provides a computed load power signal to microcontroller 74. Again, this computation shown as performed in a separate logic operation box 104 could be integrated with the microcontroller logic within microcontroller 74, either in hardware or software format. Again, suitable analog to digital conversion is routinely provided as required.

The microcontroller 74 of FIG. 2 may be any suitable commercially available microcontroller programmable to accept the inputs and provide the outputs illustrated in FIG. 2 and any others deemed suitable by the circuit designer. A suitable such microcontroller could be, for example, any of the microcontrollers in the Microchip PIC16C62X and PIC167X families.

Figure 3A:
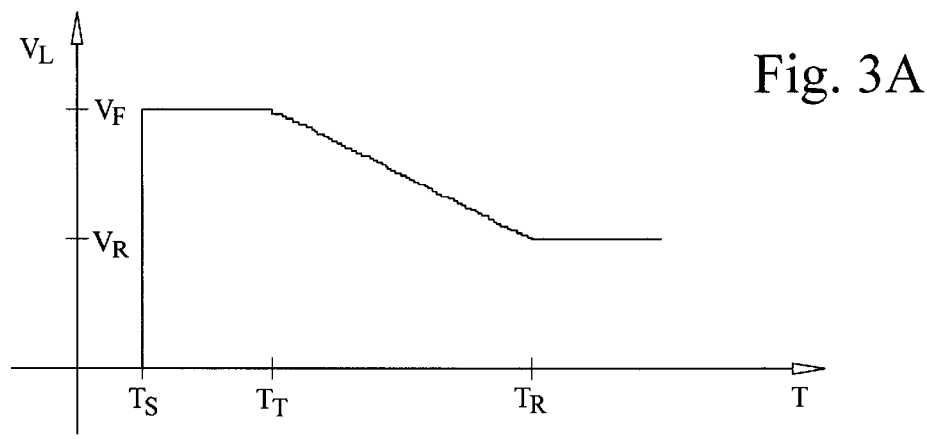
FIGS. 3A and 3B are graphs showing stepwise voltage reduction as output power supplied by a system according to the invention is reduced from rated power to a pre-set reduced power level. The scales of the axes of graph shown in FIG. 3B are magnified relative to those of the graph shown in FIG. 3A; the intersection of the axes in FIG. 3B is not intended to represent a zero value of either voltage or time.
Figure 3B:
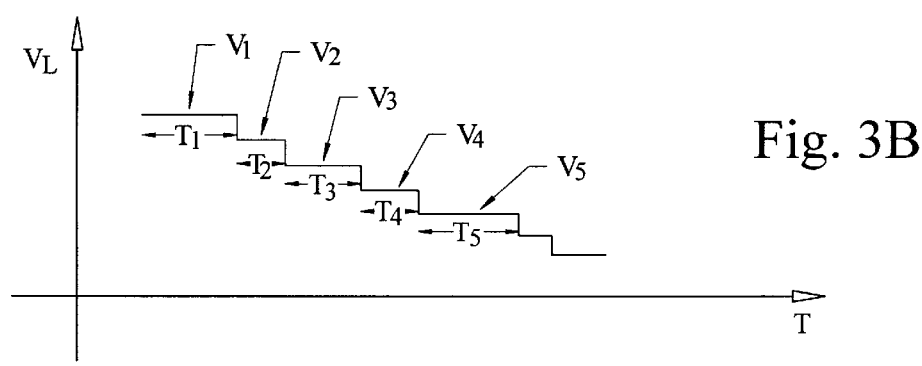

FIGS. 3A and 3B illustrate graphically the manner in which the microcontroller 74 reduces the load voltage $V_L$ from full load voltage $V_F$ to a steady-state reduced voltage value $V_R$. In both of these FIGS. 3A and 3B, load voltage $V_L$ is plotted against time T.

At a start time $T_S$, voltage is applied to the load at full rated voltage $V_F$, for example as a consequence of the closing of contacts 36, 38 (FIG. 1) or in response to some other suitable start signal. Assuming that the load is a bank of luminaires, full load voltage $V_F$ would be applied over a period of time during the early hours of the night until the pre-set time $T_T$ is reached at which voltage reduction is intended to commence. At that time $T_T$, the microcontroller 74 arranges a step-wise reduction in the load voltage $V_L$ until a steady state-reduced voltage $V_R$ is reached, which voltage $V_R$ persists until either the supply of electric power to the load is discontinued, or full load voltage is resumed, or otherwise in accordance with the designer's preference.

The step-wise reduction in voltage during the transition period between times $T_T$ and $T_R$ can be better understood with reference to FIG. 3B. FIG. 3B illustrates (on magnified scales of $V_L$ and T) a portion of the transitional voltage curve of FIG. 3A over an intermediate time span between times $T_T$ and $T_R$. Assume that over a time interval $T_1$, voltage $V_1$ is applied to the load. The end of time interval $T_1$ is determined by the microcontroller 74, which, in response to load current sensor input 100, has determined that the load current is stable and, therefore, the microcontroller 74 arranges a decremental load voltage reduction to a fresh load voltage value $V_2$. Typically the voltage differential between values $V_1$ and $V_2$ is a fixed percentage (for example, 1.5%) of the value of the immediately preceding voltage $V_1$. Voltage $V_2$ is maintained over a period of time $T_2$ of unpredictable duration; the time interval again is determined by the microcontroller 74 when the microcontroller 74 senses that the load current is stable. At the end of time interval $T_2$, the microcontroller 74 causes a further step-wise reduction in voltage to a fresh voltage level $V_3$. The voltage differential $(V_2–V_3)$ is again a fixed percentage of the immediately preceding voltage value $V_2$. This step-wise reduction in voltage continues; voltage $V_3$ persisting over a time interval $T_3$, voltage $V_4$ over a time interval $T_4$, and so forth as voltages $V_3$, $V_4$, $V_5$, etc. become progressively smaller, in each case diminishing by a voltage differential value that is a fixed percentage (within engineering limits) of the immediately preceding value. The respective set voltages $V_3$, $V_4$, $V_5$, etc. persist over time intervals $T_3$, $T_4$, $T_5$, etc., in each case, the time interval ending when the microcontroller 74 has determined that the load current is stable.

Note that although the voltage reductions illustrated in FIG. 3B are fixed by the microcontroller 74 at set voltage levels that differ from the preceding voltage value by a fixed percentage, the time intervals $T_1$, $T_2$, $T_3$, etc. are unpredictable; the time interval required to permit load current to resume a stable value may depend upon ambient conditions, the inherent characteristics of the luminaires in the load, etc., and as a result these various time intervals $T_1$, $T_2$, $T_3$, etc. are quite variable in length and not necessarily correlatable with the voltage values $V_1$, $V_2$, $V_3$, etc.

Figure 4:
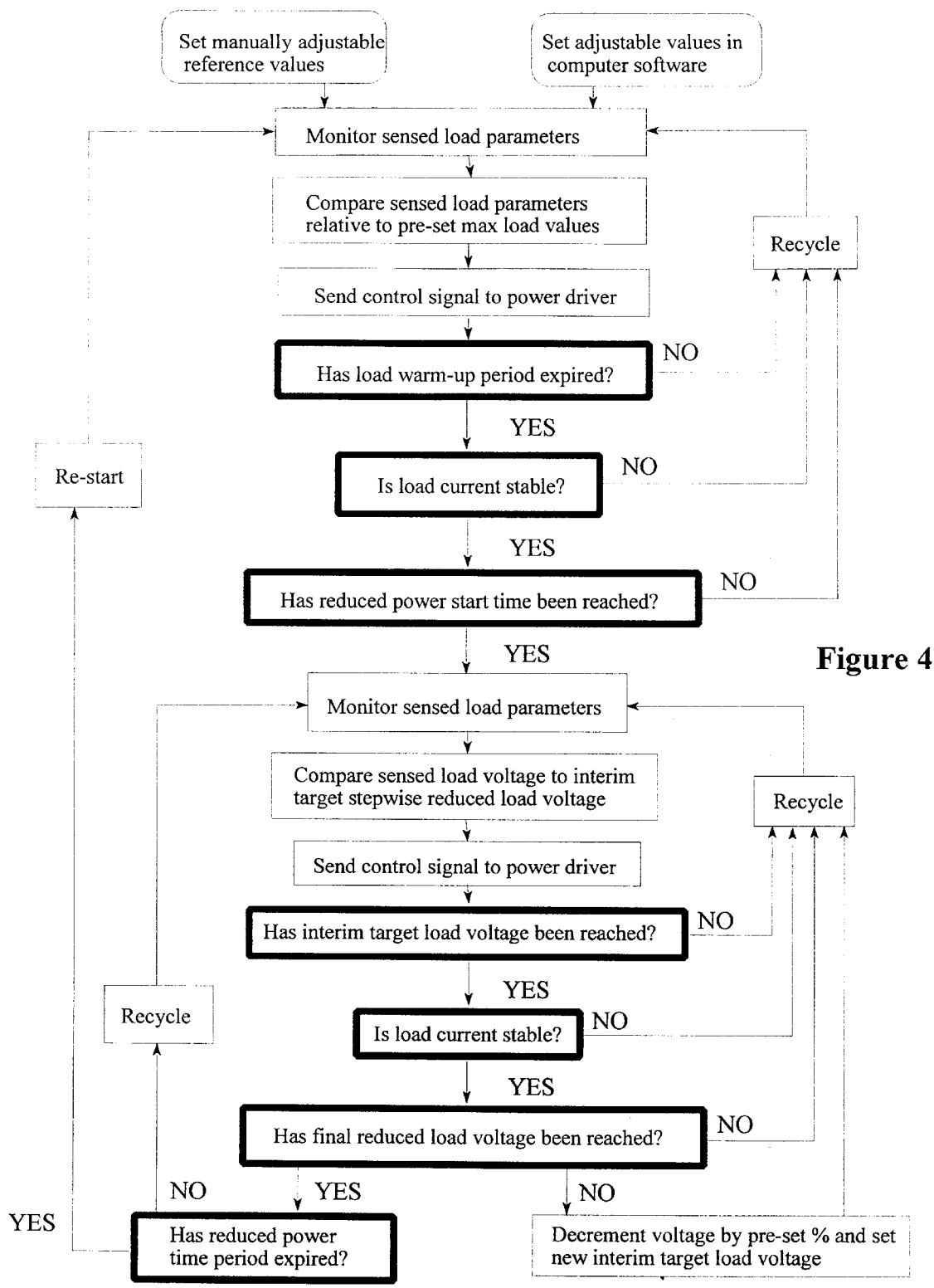
FIG. 4 is a flowchart illustrating the sequence of events in reducing output power supplied by a system according to the invention as power is reduced from rated power to a pre-set reduced power level.

In order to give effect to a progressive voltage reduction as illustrated in FIGS. 3A and 3B, the microcontroller 74 performs a series of monitoring and comparison operations and provides a number of output control signals, as better understood with reference to the flow chart of FIG. 4. The flowchart of FIG. 4 graphically depicts the human and microcontroller operations and decisions to be effected.

Referring to FIGS. 2 and 4, the operator will normally set full power output voltage reference of the references 84 to microcontroller 74 to rated nominal voltage for full power. Typically, reference settings into the microcontroller 74 are effected using suitable conventional settable control elements, for example, dip switches and trimming potentiometers (trim pots).

The operator will also establish the pre-settable output power reference 82 in one of several convenient ways. The target reduced output power reference 82 may be set (i) as a specific power value; (ii) as a percentage of maximum rated output power; or instead, assuming relatively constant current flow to the output load, (iii) as a specific reduced output voltage or as a percentage of maximum output voltage, according to the demands of the particular load to be regulated. In many instances, it will be found more convenient to set a reduced output voltage level instead of a reduced output power level, recognizing that the output power will drop in accordance with the reduced output voltage, in which case the reduced voltage output voltage reference of the references 84 will be set by the operator.

The operator will also have to set whatever timing instructions are necessary for the intended operation of the load power control circuit of FIG. 2 by adjusting the timer-clock 86, the seasonal override 88, and any other time related references that may be desired as inputs to the microcontroller 74. In at least some applications, there is available a basic clock setting establishing year, month, day of the month, and time. Also, the operator will set a power reduction commencement time for the beginning of the power reduction to the load, and a termination time at which reduced output power to the load is discontinued, at which latter time the load power setting is returned to full load power (or optionally, may be shut off entirely at dawn, or as the operator may prefer).

The seasonal override 88 illustrated in FIG. 2 is an example of a refinement that may or may not be present in commercial systems, according to the designer's preference; further, other time inputs not now shown in FIG. 2 could be provided. For example, the pre-settable reduced output power reference 82 might be a pair of reference power settings or voltage settings instead of a single voltage or power reference. For example, it might be desired to operate street lamps over the initial portion of a reduced power time interval at, for example, 75 percent of full rated power, and thereafter to make a further reduction in output power to, say, 60 percent of full rated power, or as the case may be, in which case the timer clock 86 would be set to establish the commencement period and termination period for each of the two sequential reductions of output power to the load.

The voltage reduction decrement reference 90 may also be set by means of a dip switch or the like; this reference setting establishes the decremental voltage drop or the percentage voltage reduction to occur at each step of a step-wise series of voltage reductions. The maximum amount of voltage reduction tolerated in a given step without causing interruption of illumination in street lamps (luminaires) is dependent upon the type of luminaires present in the load. In some cases, it may be desired not to reduce voltage (and thus power) in any given step by the maximum tolerated by the luminaires, but to select some lesser stepwise reduction, in the interest of avoiding a negative reaction from the human eye. It is desired that the sequential changes in illumination be substantially imperceptible to the eye, and thus reductions of about 1.5% or less are preferred (and may be required by law, in order to avoid any illumination-reduction hazard to motorists). Typically, voltage reductions are desired as a percentage of the immediately preceding voltage level.

So far, all of the settings discussed above relative to timer clock 86, seasonal override 88, output full power voltage reference 84, reduced output power reference 82 and voltage reduction decrement reference 90 have been discussed on the basis that manually adjustable dip switches, trim pots, etc., may be manually controlled. Nevertheless, as discussed, it is possible for any or all of the foregoing control settings to be incorporated not as manually operated switches providing a reference for microcontroller 74, but instead to be set as settable values within the computer program that controls the operation of microcontroller 74. If the load is expected to be constant and if no adjustment or only rarely occurring adjustment of any of the reference values is likely to be needed, then it is probably more convenient to establish the reference values as set values within the computer program controlling microcontroller 74. Accordingly, some or all of the boxes 82, 84, 86, 88, 90 and any other settable values considered desirable by the designer may optionally be integrated into the computer program as operator-selected values within the program.

Once the various reference settings required for control of the system have been set either by way of program or manual setting (both of which can be arranged to be set remotely, if required, by means of conventional communications links), the system is ready to operate. The microcontroller 74 not only receives the set values but also monitors selected circuit parameters to compare the reference settings to those relating to the state of the circuit of FIG. 2 during any given monitoring cycle. For this purpose, the microcontroller 74 reads the pre-set reference levels from the dip switches, trim pots, or other manually adjustable equipment and/or program software reference settings, and also at least the present values of load current (box 100) and load voltage (box 102) during any given monitoring cycle. The monitoring of load power (box 104) is optional because load power is a function of load current and load voltage, but because there will normally be both a resistive and a reactive component of load power, a separate monitoring of load power is desirable, at least for many types of load.

During normal default operation, the microcontroller 74 will cycle through a sequence of monitoring and comparison cycles on a continuous basis as rapidly as the speed of operation of microcontroller 74 permits, or more slowly than this if the operating program for microcontroller 74 so provides. Once a comparison of reference settings to present operating values of the parameters selected for monitoring and comparison has occurred, the microcontroller 74 will send to the power driver 65 a power control signal that will operate the power supply circuit in such a way as to provide a power level for the load that is determined by the microcontroller 74 in response to its operating program. Absent any program direction otherwise, the microcontroller 74 will send a control signal to power driver 65 so that the power supply circuit 52 under the control of power driver 65 will provide full output power to the load. (Of course, as evident from FIG. 1, if the load is a bank of luminaires, power to the load will normally be interrupted during daylight hours, as determined by the photo-electric control circuit of FIG. 1.)

For a given maximum rated power and also for luminaire start-up conditions, the power supply circuit 52 would normally be expected to operate at full rated output voltage. Accordingly, the output signal from microcontroller 74 to power driver 65 would, in the default full-power mode of operation, provide an output drive signal 64 that would constrain the power supply circuit 52 to operate at full output voltage and therefore at full output power once the load has reached steady-state operation.

With regard to the latter, the microcontroller 74 is necessarily sensitive to the need for an initial warm-up time for the luminaires or any other load that may require a warm-up. If the warm-up time has not expired or if the load current has not reached steady state stability for some other reason, the microcontroller 74 operates on a recycle basis (indicated by the "no" option at the first two points of decision in the flowchart of FIG. 4) and continues to monitor the stability of the current (via load current sensor 100 coupled to current transformer 92) until such time as current stability is indicated. Warm-up times suitable for given luminaires are often recommended by the manufacturers of the luminaires, or may be determined empirically.

Load current stability may be determined by the microcontroller 74 under the direction of the software program. For example, the microcontroller 74 may generate a running average value for load current over a predetermined number of successive samplings of the load current, the average value being continually updated. If the load current in any sample or perhaps any pair of successive samples does not diverge by more than a pre-set amount or percentage (say, less than 3%) from the average value, the load current is treated by the microcontroller 74 as being stable. Note that as normal fluctuations in load voltage may rise to about the 1% level or so, the microcontroller's threshold for active response to a computed divergence from average should not be set too low, or unwanted "hunting" oscillations in the system may develop.

Once the warm-up time required for the luminaires (or other load requiring a warm-up time) has expired and the sensed load current reading feedback signal 100 provided by current transformer 92 has reached a steady-state level, then normally no change in the output control signal from microcontroller 74 to power driver 65 will occur until such time as a reduced output power is required. This implies that the output signal from microcontroller 74 to the power driver 65, and the drive signal 64 provided by power driver 65 to the power supply circuit 52, will remain constant so as to cause power supply circuit 52 to provide maximum output power and voltage to the load until such time as reduced power is required. However, the system of FIG. 2 provides not only controlled load power reduction, but also stability of load voltage; the latter function will be described further below.

The setting of the timer clock 86, or some equivalent programmed time-setting, establishes the commencement of the power reduction cycle. The third decision box in the flowchart of FIG. 4 must be answered YES, viz that the commencement time for reducing the load power has been reached, before the microcontroller 74 proceeds to the lower portion of the flowchart of FIG. 4. Prior to that time, the microcontroller 74 remains in full output power/full output voltage mode. Note that the initiation of the load power reduction cycle may be made at some specified time of the day, or may instead be made at some specified time interval following the application of power to the load when switch terminals 36 and 38 (FIG. 1) are closed, or otherwise as the operating program for microcontroller 74 may direct. The latter option mentioned above, viz initiating the power reduction at some specified time interval following the closing of switch terminals 36 and 38 may be preferred for some applications if reduced power is desired at a specified time interval after dusk.

Whatever time setting is chosen for initiation of load power reduction, once the reduced power mode of operation is to begin, the microcontroller 74, now operating in the lower portion of the flowchart of FIG. 4, performs the usual monitoring and comparison functions, confirms that interim target load voltage has been reached and that the load current is stable, and then decrements the output voltage by a pre-set amount or (preferably in the case of luminaires) by a pre-set percentage of the previously prevailing voltage level. "Decrements the output voltage" is a shorthand way of saying that the control signal provided by the microcontroller 74 sent to power driver 65 will be varied to cause the power driver 65 in turn to send a changed control signal 64 to the power supply circuit 52. The character of the change in the control signal 64 depends upon the character of the power supply circuit 52. For some such power supply circuits, the control signal 64 might be a voltage signal of reduced value that directly forces a reduction in the output voltage of the power supply circuit 52. In other such power supply circuits, the control signal 64 is a timing signal that turns the power supply circuit 52 on or off or both for a selected portion of one complete AC operating cycle of the power supply circuit 52. (In North America, one complete cycle is ⅙₀ second; in Europe one complete cycle is ⅕₀ second.) Regardless of the specific control method chosen, the decremented voltage is preserved as a new immediate target voltage to be supplied to the load, and a corresponding control signal of appropriate value is applied by the microcontroller 74 as an input to the power driver 65. The power driver 65 in turn supplies a drive signal to the power supply circuit 52 that responds to reduce the output voltage applied to the load across terminals 56 and 60. In some designs (for example, the design shown in FIG. 7A) the function of the power driver 65 may be incorporated into the microcontroller 74 so that the microcontroller 74 provides the drive signal 64 directly to the power supply circuit 52.

The microcontroller 74, after effecting a step-wise decrement of target voltage as a fresh reference voltage to be applied to the load, will continually monitor the load current feedback signal 100 provided by current transformer 92 to determine whether the load current has reached stability. Immediately following each decrement of target output voltage, the load current will typically not be stable for a period of time (the length of the period of time during which instability persists being, to a certain extent, unpredictable and dependent upon the characteristics of the luminaires or other load being powered). Accordingly, a decision box in the lower portion of the flowchart of FIG. 4 requires the microcontroller 74 to determine not only whether the desired output voltage decrement has been achieved but also whether stability of current has been achieved. If the answer to either of these questions is NO, then the microcontroller 74 continues to recycle through the steps in the lower portion of the flowchart of FIG. 4 until such time as current stability has been achieved at the immediately preceding target reduced voltage. Once that voltage reduction has been achieved, the microcontroller 74 decrements the voltage by the prescribed amount and a fresh target voltage is establish. Successive voltage decrements and a corresponding succession of fresh target voltages are made, at each step waiting for load current to stabilize before initiating a further load voltage decrement, until the final target reduced load voltage is reached. At that point, no further decrements occur, and the load is maintained at ultimate target reduced voltage (and correspondingly reduced power) until the time is reached (typically a short time before dawn) that full load power is to be resumed, or (if the operator prefers) load power is interrupted until the next following evening, or as the case may be, at which time the entire operation in conformity with the flowchart of FIG. 4, or as the case may be, is repeated.

Note that variants and options are readily substitutable for what is set out in the exemplary flowchart of FIG. 4. For example, the preferred sequence of at least some of the decision steps can be varied. Given the objective of reaching both target voltage and stable current before a change in circuit conditions is effected, it follows that the microcontroller could test load voltage before it tests load current, or vice versa, without any substantive change in overall operation. Similar such variations, modifications and refinements can be made relative to other boxes in the flowchart of FIG. 4. And of course if the load is not a controlled set of luminaires but some other load, the flowchart might have to be quite drastically revised.

Note also that for convenience of operation, at any point in the circuit of FIG. 2, and at any stage of operation of the microcontroller 74, the values for voltages, currents, power levels, etc. at various points in the circuit may be displayed to the operator. Such display may include any desired combination of pre-set parameters (e.g., voltage settings) or monitored parameters (e.g., measured voltage values at selected points in the circuit of FIG. 2). Such displays may conveniently be effected by any suitable display device, such as light-emitting diode ("LED") displays (not illustrated in the drawings). The display may also indicate whether the microcontroller 74 is operating in default full-power mode, or in power reduction mode.

FIG. 5A illustrates an example of a power supply circuit corresponding to power supply circuit 52 illustrated in FIG. 2. FIG. 5B illustrates a portion of a power driver circuit corresponding to power driver 65 illustrated in FIG. 2 for driving the power supply circuit shown in FIG. 5A.

In FIG. 5A, voltage $V_{in}$ is applied across input terminals 40, 22 of autotransformer 110. The autotransformer 110 is provided with at least one voltage increment winding 130, and a series of voltage decrement windings 132, 134, 136, 138, 140, and what is indicated as a lowermost voltage decrement winding 150.

A bank of parallel-connected triacs Z2, Z3, Z4, Z5, Z6 are connected between "live" output terminal 56 and a series of discrete tapping points between successive winding intervals of the autotransformer 110, the uppermost triac Z1 being connected to the high-voltage end of voltage increment winding 130 and in parallel with the other triacs Z2, etc. The broken line between circuit points 48 and 58 is intended to indicate that further voltage decrement windings could be provided on the autotransformer 110, and further parallel-connected triacs could be connected between discrete successive pairs of further autotransformer decrement windings and output terminal 56, in essentially the same manner as triacs Z2 through Z6 are connected.

The gates of triacs Z1, Z2, Z3, Z4, Z5, Z6 are operated under the control of gate signals 641, 642, 643, 644, 645, and 646 respectively, corresponding collectively to the control signal 64 illustrated in FIG. 2. Each gate signal 641, etc. may be provided by a discrete optically isolated triac driver in the manner illustrated in FIG. 5B and discussed in detail below in relation to power driver circuits or the microcontroller 74 may be connected directly to the triacs Z1, etc. by a set of control lines, if necessary with power amplifiers or relays to increase the magnitude of the output drive signals.

Common input terminal 22 and common output terminal 60 may be a single terminal.

Because it is expected that a controlled voltage reduction in the output voltage will proceed in a step-wise decremental fashion, as discussed above, as many autotransformer voltage decrement windings and as many associated triacs will be provided as are needed to effect suitable controlled stepwise voltage reduction.

If only one voltage increment winding 130 is provided it should be selected or designed to provide the maximum additional voltage required to compensate for the greatest negative voltage fluctuation expected in the input voltage $V_{in}$. Additional intermediate incremental voltage windings (or taps on winding 130) may be used if finer control over full power voltage is desired under low input voltage $V_{in}$ conditions. The voltage decrement windings 132, 134, 136, etc. provide a selection of voltage decrements sufficient to compensate for positive voltage fluctuation in the input voltage $V_{in}$ when full power voltage is desired and in addition provide the controlled step-wise reduction of output voltage from rated full-power voltage to the reduced voltage required to drive the output load at a predetermined reduced power setting.

Note that it is possible, in the circuit of FIG. 5A, to provide larger or smaller voltage decrements for the decrement windings by having a smaller or greater number of voltage decrement windings available to span the total expected voltage differential to be accommodated. With fewer voltage decrement windings, fewer triacs are required, and the manufacturing expense is consequently lower. The trade-off is between cost and fine control of the output voltage. Note that an equivalent such circuit using a conventional transformer rather than an autotransformer may be substituted; such substitution is within the skill of circuit designers and requires no elaboration.

Figure 8:
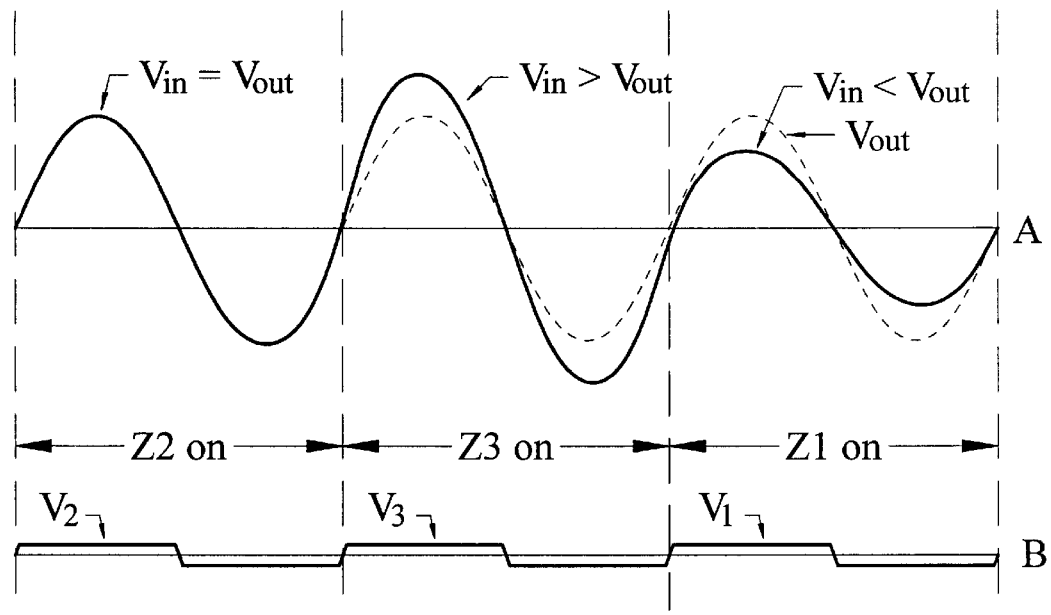
FIG. 8 is a set of graphs illustrating the operation of the circuit of FIG. 5A in output voltage stabilization mode.

The operation of the circuit of FIG. 5A can be further understood by referring to FIG. 8, which comprises two synchronized hypothetical waveform Graphs A and B. In this particular illustration, the operation of the circuit of FIG. 5A in voltage stablization mode is being analyzed. In Graph A, instantaneous AC voltage is plotted as a function of time, and plots are shown for input voltage $V_{in}$ and output voltage $V_{out}$ in the circuit of FIG. 5A.

In the first cycle of the waveform shown in Graph A, the input voltage $V_{in}$ is equal to the output voltage $V_{out}$. The microcontroller 74, sensing the equality of the input and output voltages, and finding that the output voltage $V_{out}$ is at the target reference value, causes a control signal 642 to be sent to the gate of triac Z2, causing triac Z2 to conduct current throughout the entirety of the AC cycle in the first panel of Graph A, corresponding to the first AC cycle illustrated. In other words, there will be in effect a direct conductive circuit between input terminal 40 and output terminal 56.

Graph B, vertically aligned along the time axis with Graph A, again plots voltage against time, in this case the voltage drop across selected ones of various of the triacs Z1, etc. In the first panel, corresponding to the first AC cycle of Graph A, Graph B illustrates the fact that triac Z2 is fully conducting during the first AC cycle; voltage drop $V_2$ across the triac Z2 is minimal (approximately 1 volt) and is uninterrupted from the beginning to the end of the AC cycle illustrated.

If the input voltage $V_{in}$ rises above rated level as in the second AC cycle illustrated in Graph A of FIG. 8, then the circuit of FIG. 5A must compensate for the increase so as to maintain the output voltage $V_{out}$ as constant as possible. Microcontroller 74, having sensed the increase in input voltage $V_{in}$, will in response to that increase provide a control signal to the gate of a selected one of the triacs Z3, Z4, Z5, Z6 rendering it conductive. Assuming that the required decrement is best provided by decrement winding 132, the microcontroller 74 will provide a control signal 643 to the gate of triac Z3. Since the triac Z3 is tapped into autotransformer 110 at a point below the first voltage decrement winding 132, it follows that, the voltage $V_{out}$ at output terminal 56 will be lower than the voltage at input terminal 40. The triac Z3 will conduct through the complete AC cycle as illustrated in the second panel of Graph B. In the second AC cycle, it can be seen that the voltage drop $V_3$ across triac Z3 is minimal (approximately 1 volt), indicating that the triac Z3 is fully conductive throughout the entirety of the AC cycle illustrated.

Note that in the second panels of Graphs A and B it has been assumed that decrement winding 132 provides exactly the necessary voltage decrement to compensate for the increase in input voltage $V_{in}$. This will not always be the case; in most situations the microcontroller 74 will have to select the triac connected to a tap of the autotransformer 110 that provides output voltage $V_{out}$ closest to the desired output voltage $V_{out}$.

If the input voltage $V_{in}$ is lower than the target output voltage $V_{out}$, then a voltage increment must be supplied by the circuit of FIG. 5A. This is accomplished, once the microcontroller 74 senses the voltage discrepancy and determines that the discrepancy is sufficiently large that the increased voltage supplied by winding 130 will provide an output voltage $V_{out}$ that is closer to the desired output voltage $V_{out}$ than that provided by the input voltage $V_{in}$, by having the microcontroller 74 send a gate signal 641 to render the triac Z1 conductive. As the triac Z1 is connected between output voltage terminal 56 and the high-voltage end of voltage increment winding 130 of autotransformer 110, the triac Z1 will supply an output voltage $V_{out}$ at output terminal 56 that is higher than the input voltage $V_{in}$ at input terminal 40. The triac Z1 will be conductive throughout the entirety of the cycle, as illustrated in the third panel for the third AC cycle illustrated in Graph B of FIG. 8. Graph B illustrates that voltage V, across triac Z1 is minimal (approximately 1 volt) from beginning to end of the AC cycle, indicating that triac Z1 is fully conductive throughout that cycle.

Of course the waveform sequence of FIG. 8 is artificial; it would not be expected that the three conditions illustrated would follow one another in consecutive AC cycles. The three panels are present to illustrate three different conditions, not an expected sequence of three successive AC cycles.

If the requisite voltage increment or voltage decrement to be provided by the circuit of FIG. 5A is less than the full increment or decrement available across a given winding of autotransformer 110, then the microcontroller 74 selects that triac that will provide the output voltage closest to the desired output voltage. If finer increments or decrements are deemed desirable by the designer, then additional triacs and additional corresponding winding taps may be added.

The power driver 65 suggested for the circuit shown in FIG. 5A comprises the circuit 651 within dashed lines in FIG. 5B for triac Z1 and a discrete identical such circuit for each of the other triacs Z2, etc. shown in FIG. 5A. Each such circuit includes a zero-crossing optically isolated triac driver TD1, such as that manufactured by Motorola under item no. MOC3163; the selection of values for resistors $R_I$ and $R_G$ shown in FIG. 5B is discussed in detail in Motorola Semiconductor Application Note AN982/D. While the power supply circuit illustrated in FIG. 5A could be driven directly by the microcontroller 74, the use of zero-crossing optically isolated triac drivers is suggested to eliminate current surges and the resulting electromagnetic interference that would result if switching from one voltage to another was attempted while a triac was conducting.

If high voltage or current is to be controlled using the power supply circuit illustrated in FIG. 5A, then back-to-back (reverse parallel SCRs may be substituted for the triacs Z1, etc.

Another embodiment of the controlled power supply circuit 52 according to the invention is illustrated in FIG. 6. An autotransformer 110 is connected between input terminals 40 and 22; terminal 22 serving as a common terminal, and input terminal 40 serving as the "live" terminal. Autotransformer 110 is tapped at the central point 166 of its winding by a fixed tap connected to the "high voltage" side of the primary winding 162 of auxiliary transformer 160. The other "low voltage" terminal of primary winding 162 is connected to an adjustable variable voltage tap 168 that taps the autotransformer winding 110 at a point determined by a servomotor 170 acting in response to power driver 65 of microcontroller 74 (FIG. 2; see also the discussion below of FIGS. 11 and 12). Suitable servomotors for low temperature operation are available from Crouzet. The autotransformer 110 may be a standard variac.

The secondary winding 164 of auxiliary transformer 160 is connected in series between input "live" or "hot" terminal 40 and output "live" or "hot" terminal 56 of the power supply circuit of FIG. 6. Output terminal 60 is a neutral terminal which may be one and the same terminal as input neutral terminal 22.

If microcontroller 74 provides a control signal that, ultimately converted to analog and applied as an input control signal to servomotor 170, positions variable tap 168 at centre tap 166 of autotransformer winding 110, then the output voltage $V_{out}$ will be identical to input voltage $V_{in}$. It can be seen that, in such an instance, the voltage $V_P$ across primary winding 162 of auxiliary transformer 160 is zero, and therefore no augmenting voltage $V_S$ across secondary winding 164 of auxiliary transformer 160 will be induced. Consequently, the voltage $V_{out}$ across terminals 56 and 60 will be absolutely identical to voltage $V_{in}$ across input terminals 40 and 22.

Figure 9:
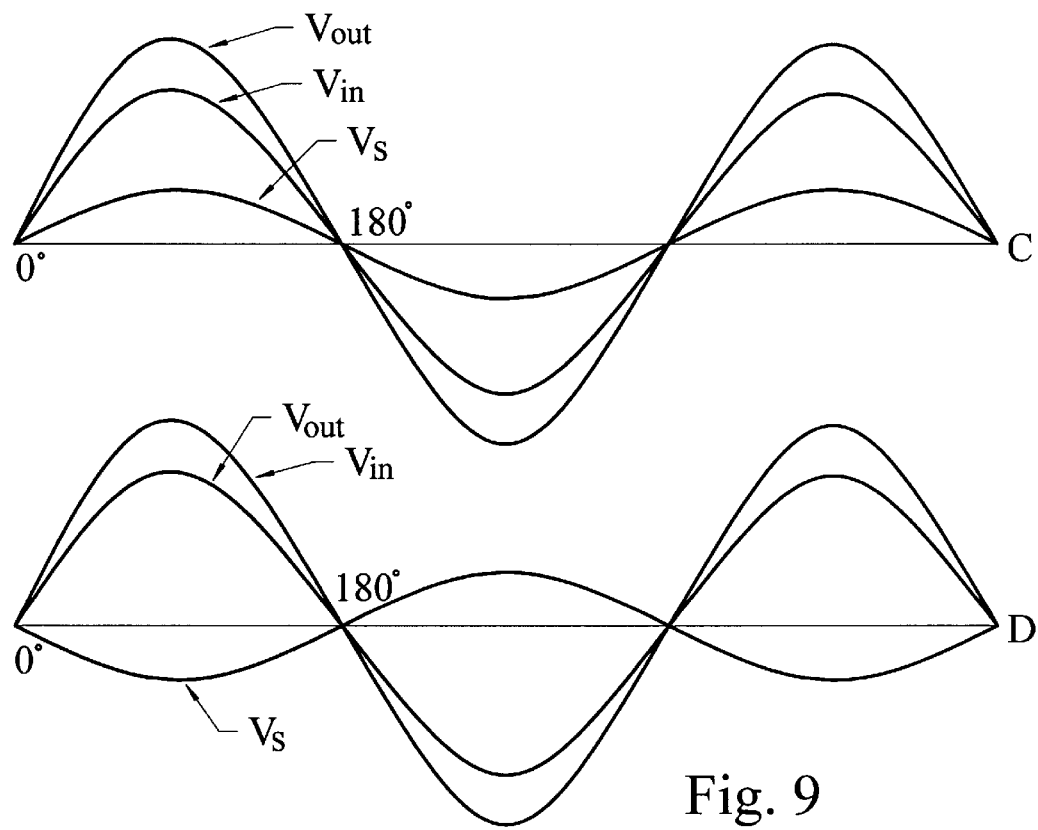
FIG. 9 is a set of graphs illustrating the operation of the circuit of FIG. 6 in output voltage stabilization mode.

In the event that microcontroller 74 sends a control signal to power driver 65 which, in turn, provides an input control signal 64 to servomotor 170 that positions variable tap 168 at a point lying between terminals 40 and 166, then the output voltage $V_{out}$ will be higher than the input voltage $V_{in}$. This result is reflected in Graph C of FIG. 9, which is a plot against time of input voltage $V_{in}$, output voltage $V_{out}$, and secondary winding voltage $V_S$ of auxiliary transformer 160. These three voltage wave forms are in phase; by way of example one and a half cycles of the wave forms of each voltage component are illustrated in Graph C of FIG. 9.

It can be seen that voltage $V_S$, being exactly in phase with voltage $V_{in}$, augments voltage $V_{in}$ to produce a voltage $V_{out}$ that is the sum of the instantaneous voltages $V_{in}$ and $V_S$ at any point in time.

If, on the other hand, the microcontroller 74 provides a control signal to power driver 65 that in turn provides servomotor control signal 64 to the servomotor 170 so as to position variable tap 168 between terminal 166 and terminal 22, then the output voltage $V_{out}$ across output terminals 56 and 60 will be less than the input voltage $V_{in}$ across input terminals 40 and 22. This situation is suitable for operation of the power supply circuit of FIG. 6 during the intended "reduced voltage" portion of a diurnal cycle of operation.

For the reduced output voltage mode of operation, voltages $V_{in}$, $V_S$, and $V_{out}$ are plotted against time over one and a half cycles in curve D, as is the case in curve C, but this time, the voltage $V_S$ is 180° out of phase with the voltage $V_{in}$. Consequently, the output voltage $V_{out}$ is, at any given time, the difference between voltages $V_{in}$ and $V_S$.

Figure 7B:
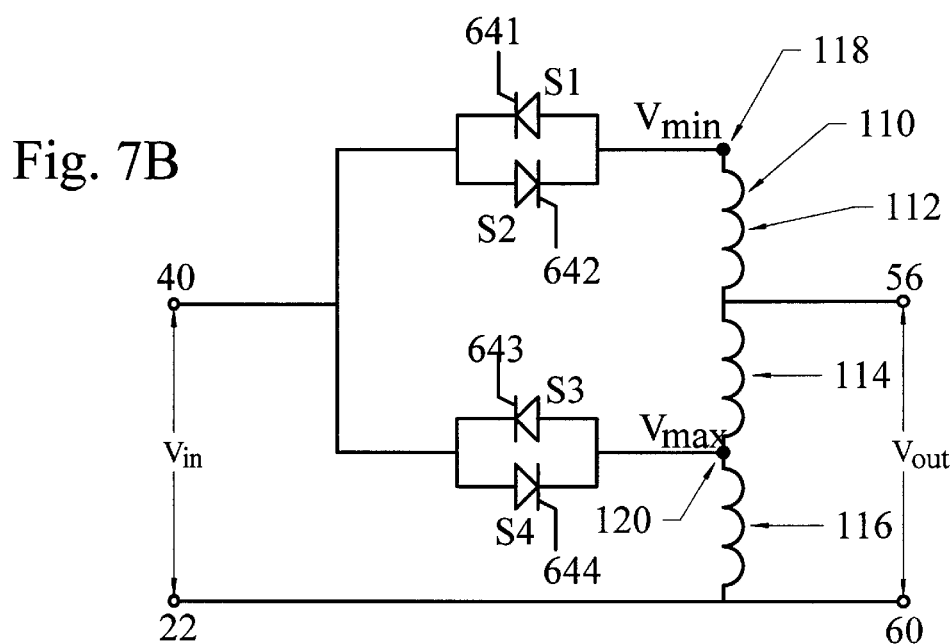
FIG. 7B (on the same sheet as FIG. 5B) is a circuit diagram illustrating an alternative power supply circuit equivalent to the circuit diagram shown in FIG. 7A.

FIG. 7A illustrates an embodiment of a controlled power supply circuit utilizing an autotransformer 110 and two pairs of parallel reverse-coupled silicon controlled rectifiers (SCRs) comprising, in one reverse-coupled pair, SCRs S1 and S2, and in the other reverse coupled pair, SCRs S3 and S4. FIG. 7B illustrates a mirror image of the circuit shown in FIG. 7A; its operation will be evident to those skilled in the art in view of the discussion below. Suitable optical coupling or other isolating circuit element (not shown) can be interposed between the microcontroller 74 and the SCR gates 641, etc. In the following discussion, mention is made of the microcontroller 74 applying control pulses to gates 641, etc. but it is to be understood that the pulses may be applied indirectly via the isolation device.

The circuit of FIG. 7A is able to supply an output voltage $V_{out}$ from an input voltage $V_{in}$ in with a value of output voltage $V_{out}$ varying between a maximum possible output voltage $V_{max}$ and a minimum value $V_{min}$. To meet the foregoing objective, autotransformer 110 is divided into three coil segments 112, 114 and 116 connected in series. The input voltage $V_{in}$ is applied across input terminals 40 and 22, the "live" input terminal 40 being connected to the point of connection between coils 112 and 114 and the input terminal 22 being essentially a neutral terminal directly connected to the low-voltage point of coil 116 and to output terminal 60. The voltage $V_{max}$ is available at the connection point 118, being the voltage across the series-connected coils 112, 114, 116. The minimum voltage $V_{min}$ is available at the connection point 120 between coils 114 and 116. The output voltage $V_{out}$ is obtained across terminal 56 and neutral terminal 60. Note that in conformity with standard electrical practice, the neutral terminal 60 may be grounded in circumstances where this would be usual. This remark applies generally to neutral terminals and lines described in this specification.

The input terminal of SCR pair S1, S2 is connected to the high-voltage terminal 118 of autotransformer 110 while the low-voltage terminal 120 is connected to the input of the other SCR pair S3, S4. The gates of SCRs S1 through S4 are operated under the control of gate signals 641, 642, 643 and 644, respectively, corresponding collectively to the control signal 64 illustrated in FIG. 2. The outputs of both reverse-coupled SCR pairs S1 through S4 are in turn connected together and to "live" output terminal 56.

Figure 10A:
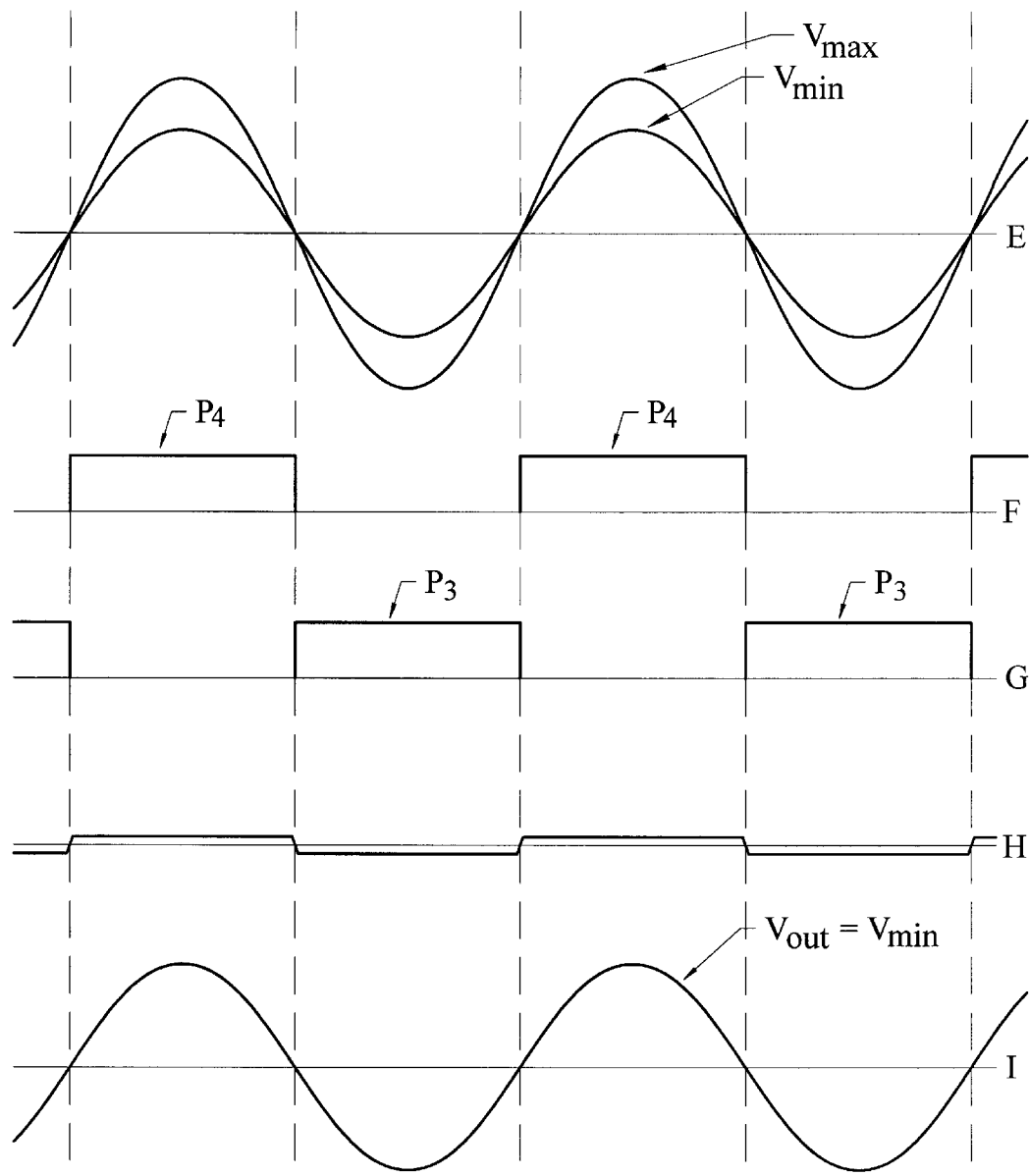
FIG. 10A, 10B and 10C are a set of graphs illustrating the operation of the circuit of FIG. 7A in output voltage stabilization mode.
Figure 10B:
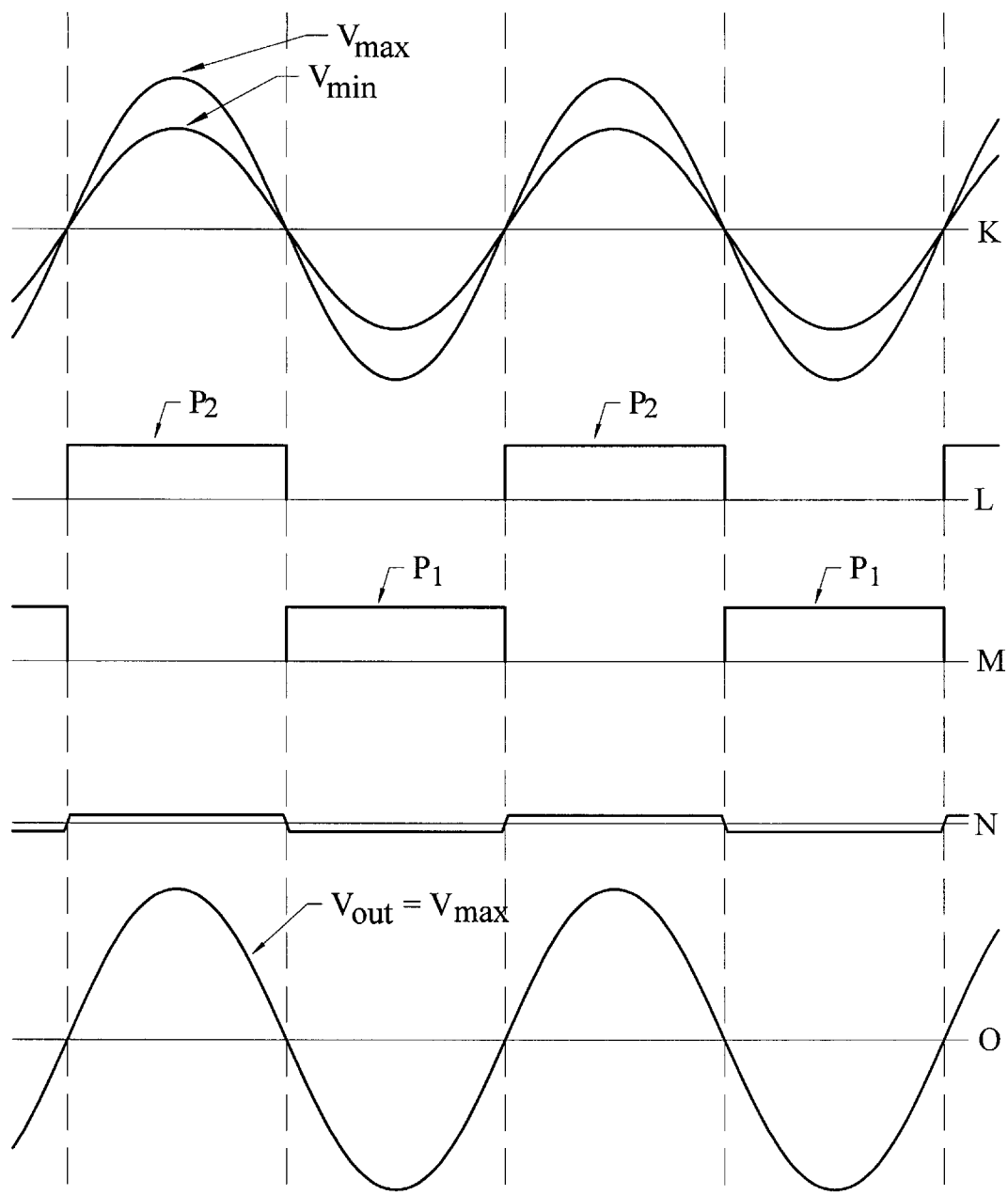
Figure 10C:
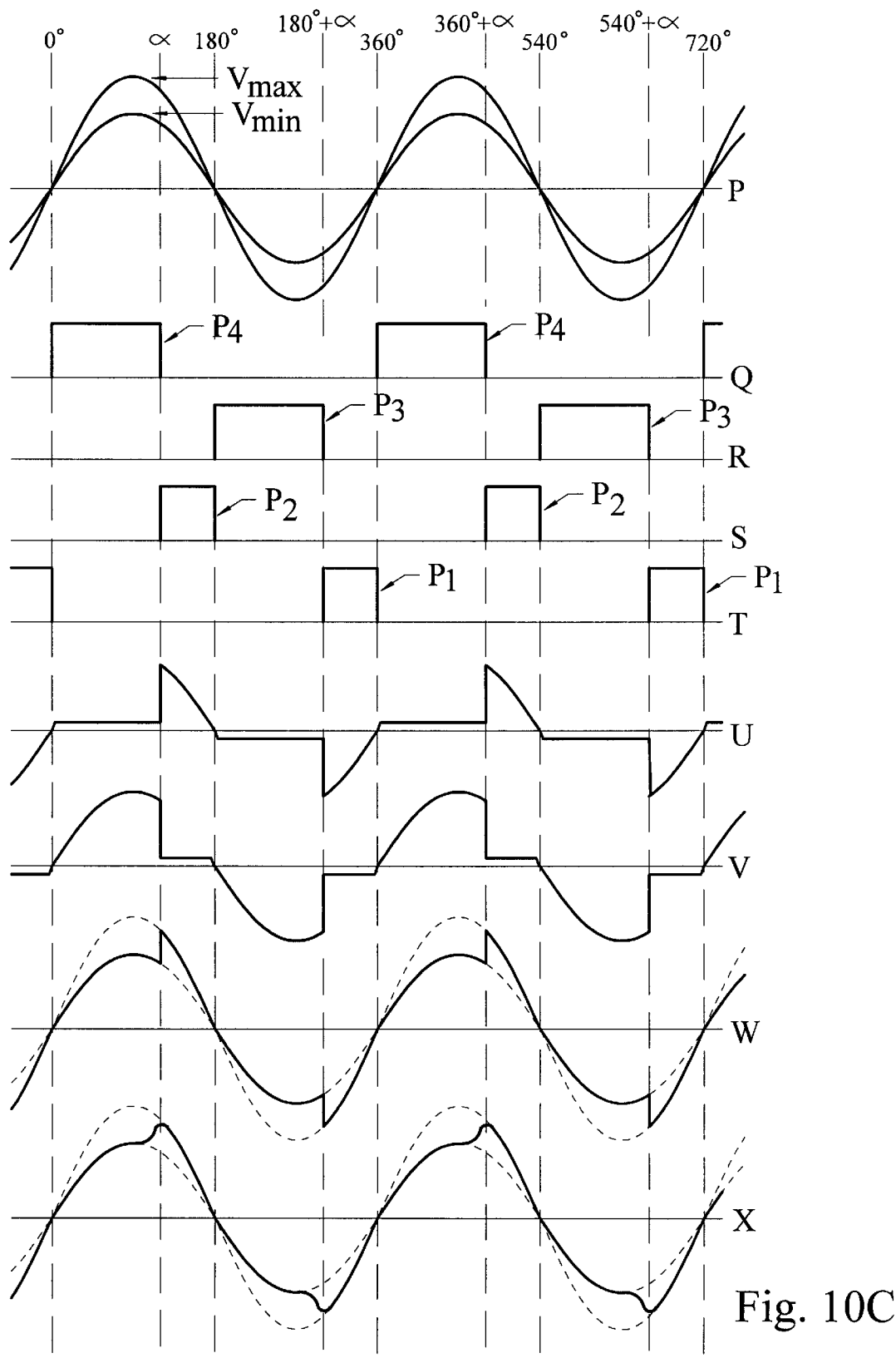

To understand the operation of the circuit of FIG. 7A, resort may be had to FIGS. 10A, 10B and 10C. The graphs of FIGS. 10A, 10B and 10C comprise a series of vertically aligned voltage graphs (ordinate) plotted against time (abscissa). FIG. 10A illustrates the situation in which the microcontroller has determined that $V_{out}$ should equal $V_{min}$. FIG. 10B illustrates the situation in which the microcontroller has determined that $V_{out}$ should equal $V_{max}$. FIG. 10C illustrates the situation in which the microcontroller has determined that $V_{out}$ should be between $V_{min}$ and $V_{max}$. In each case the load connected across terminals 56. 60 is assumed to be resistive.

In the top graph E of FIG. 10A, somewhat more than two complete cycles of voltages $V_{min}$ and $V_{max}$, appearing as an ordinary sine waves, are illustrated, voltage $V_{min}$ occurring at terminal 120 of FIG. 7A and voltage $V_{max}$ occurring at terminal 118 of FIG. 7A. To provide $V_{out}$ equal to $V_{min}$, the microcontroller 74 applies pulses (directly or indirectly via a suitable isolation device, as mentioned) to gate lines 643, 644 (indicated in Graphs G and F as pulses $P_3$ and $P_4$, respectively) connected to SCRs S3 and S4, respectively. Note that the microcontroller 74 may supply a constant gate current to gates of SCRs S3 and S4, as in this case timing is not critical and pulsing the gates is not necessary as the goal is for SCRs S3 and S4 to each conduct fully for the half cycle in which they are forward-biased. No current is applied to the gates of SCRs S1 and S2. Graph H illustrates the voltage drop across the pair S3, S4 measured from terminal 120 to terminal 56. The output voltage $V_{out}$ measured across terminals 56, 60 is shown in Graph I.

In the top graph K of FIG. 10B (which is identical to Graph E of FIG. 10A, but is repeated for ease of reference), somewhat more than two complete cycles of voltages $V_{min}$ and $V_{max}$, appearing as an ordinary sine waves, are illustrated, voltage $V_{min}$ occurring at terminal 120 of FIG. 7A and voltage $V_{max}$ occurring at terminal 118 of FIG. 7A. To provide $V_{out}$ equal to $V_{max}$, the microcontroller 74 applies pulses to gate lines 641, 642 (indicated in Graphs M and L as pulses $P_1$ and $P_2$, respectively) connected to SCRs S1 and S2, respectively. Note that the microcontroller 74 may supply a constant gate current to gates of SCRs S1 and S2, as in this case timing is not critical and pulsing the gates is not necessary as the goal is for SCRs S1 and S2 to each conduct fully for the half cycle in which they are forward-biased. No current is applied to the gates of SCRs S3 and S4. Graph N illustrates the voltage drop across the pair S1, S2 measured from terminal 118 to terminal 56. The output voltage $V_{out}$ measured across terminals 56, 60 is shown in Graph 0.

In the top graph P of FIG. 10C (which is identical to Graphs E and K of FIGS. 10A and 10B, but is repeated for ease of reference), somewhat more than two complete cycles of voltages $V_{min}$ and $V_{max}$ appearing as an ordinary sine waves, are illustrated, voltage $V_{min}$ occurring at terminal 120 of FIG. 7A and voltage $V_{max}$ occurring at terminal 118 of FIG. 7A. To provide $V_{out}$ between $V_{min}$ and $V_{max}$, the microcontroller 74 applies pulses to gate lines 641, 642, 643, and 644 (indicated in Graphs T, S, R, and Q as pulses $P_1$, $P_2$, $P_3$, and $P_4$, respectively) connected to SCRs S1, S2, S3, and S4, respectively. Note that the microcontroller 74 does not supply a constant gate current to gates of the SCRs S1, S2, S3, and S4, as in this case timing is critical and pulsing the gates is necessary. Graph U illustrates the voltage drop across the pair S3, S4 measured from terminal 120 to terminal 56. Graph V illustrates the voltage drop across the pair S1, S2 measured from terminal 118 to terminal 56. The output voltage $V_{out}$ measured across terminals 56, 60 is shown in Graph W.

In the following discussion the timing of the application of gate pulses to SCRs S1, S2, S3, and S4 is given by the "phase angle", which refers to the angle (one complete AC cycle being 360°) at which gate pulses are applied relative to the AC waveform of the voltage across the SCR in question. In particular, in the graphs shown in FIG. 10C, phase angles are measured relative to the rising zero crossing of the voltages $V_{min}$ and $V_{max}$ shown in Graph P. Dashed vertical lines are used in FIG. 10C to shown the correspondence of phases angles between graphs.

The pattern of pulses $P_1$, $P_2$, $P_3$, and $P_4$, applied by microcontroller 74 to the gates of SCRs S1, S2, S3, and S4, respectively, begins with pulse $P_4$ being applied to SCR S4 at phase angle 0° causing SCR S4 to conduct. At phase angle α, pulse $P_2$ is applied to SCR S2 driving SCR S2 into conduction, which reverse-biases SCR S4 causing it to cease to conduct. At a phase angle of 180°, pulse $P_3$ is applied to SCR S3 causing SCR S3 to conduct. At a phase angle of 180°+α, pulse $P_1$ is applied to SCR S1 driving SCR S1 into conduction, which reverse-biases SCR S3 causing it to cease to conduct.

It is not critical that the pulses last until the next pulse in the series is applied so long as the pulses $P_4$ and $P_3$ commence at phase angles 0° and 180° degrees, respectively, and pulses $P_2$ and $P_1$ commence at phase angles α and 180°+α, respectively.

In order to avoid transient effects that might be caused by voltage surges when the voltage $V_{out}$ shifts from the $V_{max}$ value to the $V_{min}$ value or vice versa, a smoothing capacitor 70 or other suitable output smoothing filter across output terminals 56 and 60 (see FIG. 2) is typically provided to generate a smoother final output voltage $V_{out}$, as illustrated in Graph X of FIG. 10C. The smoothing capacitor 70 has not been illustrated in FIG. 7A but will typically be present. The resulting smoothed final output voltage $V_{out}$, illustrated in Graph X will have an RMS value between $V_{min}$ and $V_{max}$ determined by the value of phase angle α.

Considering FIGS. 10A, 10B, and 10C together, it can be seen that if it is desired that the output voltage $V_{out}$ be an absolute minimum, then one would choose the phase angle α to be 180° (in effect SCR pair S1, S2 would not conduct at all). Equally, if it is desired that the output voltage $V_{out}$ be equal to the maximum value $V_{max}$ available from the circuit of FIG. 7A, then the phase angle α is chosen to be 0° (in effect SCR pair S3, S4 would not conduct at all) . If the phase angle α is chosen to be at a value between 0° and 180°, then the output voltage $V_{out}$ is necessarily somewhere between $V_{max}$ and $V_{min}$, Graph W illustrating the exemplary choice of α between 90° and 180°, thereby providing an output voltage $V_{out}$ that is between the minimum value $V_{min}$ and maximum value $V_{max}$ on an RMS basis. Note that to obtain this control over the output voltage, the microcontroller 74 does not have to provide any voltage value signal; rather, it provides a timing signal that controls the timing of the gate pulses $P_1$, $P_2$, $P_3$, $P_4$. Accordingly, the time control signal provided by microcontroller 74 is translated into a voltage control signal as the result of the gated operation of the SCRS S1, S2, S3 and S4.

The cycle of pulses $P_4$, $P_2$, $P_3$, and $P_1$, continues recurring indefinitely every 360° of phase angle as long as power is required by the load. For example, in FIG. 10C the cycle of pulses $P_4$, $P_2$, $P_3$, and $P_1$ recurs at phase angles of 360°, 360°+α, 540°, and 540°+α (0°+360°, α+360°, 180°+360°, and 180°+α+360°). The microcontroller 74, when necessary, varies the phase angle α to adjust the voltage $V_{out}$, but the cycle of pulses continues until voltage $V_{out}$ is no longer required.

Figure 11:
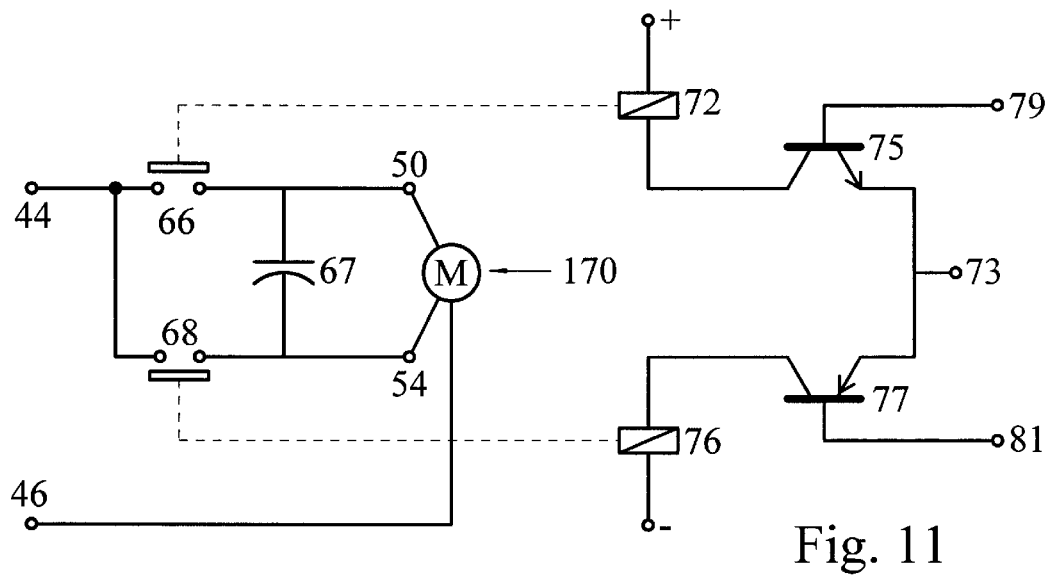
FIG. 11 is a circuit diagram illustrating a power driver circuit suitable for use with the power supply circuit of FIG. 6.

FIG. 11 illustrates one possible power driver for use as the power driver 65 in FIG. 2, for use in conjunction with the FIG. 6 output power circuit.

In FIG. 11, the servomotor 170 has its neutral terminal connected to input neutral terminal 46. The servomotor 170 is provided with clockwise drive in put terminal 50 and a counterclockwise drive input terminal 54. "Live" or "hot" input terminal 44 provides current to input terminal 50 or input terminal 54, depending upon whether switch 66 connected between input terminal 44 and clockwise drive terminal 50 is closed, or whether switch 68 connected between input hot terminal 44 and counterclockwise drive power terminal 54 is closed. A startup/running capacitor 67 connected across the two drive terminals 50, 54 tends to prevent "stuttering" of the servomotor 170.

Switch 66 closes when its associated actuating relay coil 72 passes current. Equally, switch 68 closes with its associated actuating relay coil 76 passes current.

Relay coil 72 is driven by power transistor 75, and relay coil 76 is driven by power transistor 77. The emitters of the two transistors 75, 77 may be connected to a common terminal 73. The gates of transistors 75, 77 are driven via drive signal terminals 79, 81 respectively. The microcontroller 74 provides a square-wave-type drive signal via a digital/analog converter to the selected gate drive terminal 79, 81 depending upon whether clockwise or counterclockwise rotation of servomotor 170 is required.

In operation, if the microcontroller 74 detects that the output voltage differs by more than a threshold differential from a particular target output voltage value for the time being established, then the microcontroller 74 will provide an appropriate drive signal (typically a limited DC voltage) to either the gate terminal 79 or the gate terminal 81, depending upon whether the voltage adjustment required necessitates a clockwise or counterclockwise rotary movement of the armature of servomotor 170. The signal applied to gate terminal 79 or 81, as the case may be, is continued until the microcontroller 74 senses that the actual output load voltage is equal to the interim target voltage (within a tolerance or threshold) and at that time, the microcontroller 74 discontinues sending a control signal to gate terminal 79 or 81, as the case may be.

The manner in which servomotor 170 supplies control signal 64 to power supply circuit 52 has already been described with reference to FIG. 6.

While FIG. 11 illustrates a circuit suitable for driving the power supply circuit of FIG. 6, essentially similar drive principles could be established for other types of power supply circuits and power drivers suitable for use therewith.

Figure 12:
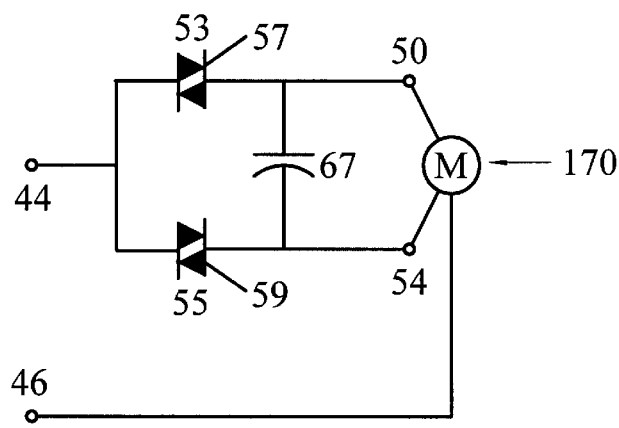
FIG. 12 is a circuit diagram illustrating an alternative power driver circuit suitable for use with the power supply circuit of FIG. 6.

FIG. 12 is a circuit diagram of an alternative power driver circuit again for use with the servomotor-controlled power supply circuit of FIG. 6. In this case, the servomotor 170 is shown connected in exactly the same way as the servomotor 170 was connected in FIG. 11, with the exception that switches 66 and 68 have been replaced by triacs 53 and 55 respectively. Accordingly, power is supplied to clockwise drive power terminal 50 if triac 53 is conducting, and power is supplied to counterclockwise power drive terminal 54 if triac 55 is conducting. Triac 53 is provided with a gate 57 to which the microcontroller 74 will selectably cause to be sent a suitable DC control signal (using appropriate digital/analog conversion) thereby forcing a clockwise rotary motion of the armature of servomotor 170. Similarly, if counterclockwise rotary movement of the servomotor armature were required, then the microcontroller 74 would cause to be applied the appropriate DC gate control signal to gate 59 of triac 55, thereby supplying power to counterclockwise power drive terminal 54.

Alternative circuits suitable for driving the power supply circuits of FIGS. 5A, 6 and 7A (or 7B) can be readily devised using standard circuit design principles by analogy to the circuits of FIGS. 5B, 11 and 12 provided by way of exemplification.

EXAMPLE

The example to be given refers to the circuit of FIG. 6. Four different operating conditions will be examined; viz a first operating condition in which the output voltage supplied to the load is to be equal to the input voltage, a second in which the output voltage supplied to the load is to be greater than the input voltage, and a third in which the output voltage supplied to the load is to be less than the input voltage. In a variant of the third condition, a fourth condition is examined in which it is desired that the output voltage be less than rated full-power voltage. In all three cases to be examined by way of example, the output voltage $V_{out}$ is to be 240 volts, and rated load current is to be 10 amperes supplied to a load of 24 ohms.

First operating condition: $V_{out}=V_{in}$

The output voltage $V_{out}$ is to be equal to the input voltage $V_{in}$ at a value of 240 volts. In this case, the variable tap 168 on autotransformer 110 will be positioned (under the control of servomotor 170 in turn responding to the power driver 65 and microcontroller 74) to be coincident with centre point 166 of the autotransformer winding 110. In such case, the voltage drop across the auxiliary transformer 160 is zero and, accordingly, rated load current of 10 amperes will flow to the load connected across output terminals 56 and 60 to supply 2,400 watts to the load.

Second operating condition: $V_{out}>V_{in}$

Now consider a second case in which the output voltage is to be higher than the input voltage. Assume that, as was the case previously, the output load is 24 ohms and it is desired to deliver 2,400 watts to the load at an output voltage $V_{out}$ of 240 volts, but the input voltage $V_{in}$ is only 220 volts. In such case, it is necessary that the voltage $V_S$ across the secondary winding 164 of auxiliary transformer 160 contribute an additional 20 volts to the output voltage. This result is accomplished by positioning the variable tap 168 at the correct position along autotransformer winding 110; the correct position must necessarily be located between terminals 40 and 166. The analysis is as follows:

As 10 amperes must be flowing through auxiliary transformer secondary winding 164, then voltage $V_P$ and current $I_P$ across and through primary winding 162 of auxiliary transformer 160 can be computed. If we assume that the turns ratio $\Gamma$ of auxiliary transformer 160 is 2.5, then primary winding current $I_P$ is given as follows:

$$I_P = I_S/\Gamma = 10/2.5 = 4 \text{ amperes.}$$

The voltage $V_P$ required to deliver the additional 20 volt component $V_S$ provided by secondary winding 164 is given as follows:

$$V_P = (V_S)(\Gamma) = (20)(2.5) = 50 \text{ volts.}$$

We require output power $P_L=2,400$ watts to be delivered to the load at an output voltage of 240 volts in this example, and the input voltage is only 220 volts. We know that the input current $I_{in}$ is given by:

$$I_{in} = P_L/V_{in} = 2400/220 = 10.9 \text{ amperes.}$$

Of this 10.9 amperes, 10 amperes of course flows through secondary winding 164 of auxiliary transformer 162 to the load. Accordingly, 0.9 amperes (approximately) flows through autotransformer 110. Since it has already been determined above that in the primary winding 162 of auxiliary transformer 160 the voltage is 50 volts and the current is 4 amperes, it follows that the voltage contribution for transformer primary winding 162 must be a 50-volt contribution across that portion of the autotransformer winding 110 lying between the position of variable tap 168 and centerpoint 166. Further, since the current flow of 4 amperes through the aforementioned portion of autotransformer winding 110 is in opposition to the 0.9 amperes net current flow through the autotransformer 110, it follows that the net current in the portion of autotransformer winding 110 lying between variable tap 168 and fixed tap 166 will be 3.1 amperes (4.0 amperes less 0.9 amperes). Since the total voltage drop across autotransformer winding 110 is 220 volts, it follows that midpoint tap 166 is at a voltage of 110 volts. As the voltage drop between fixed tap 166 and terminal 40 must also be 110 volts, it follows that variable tap 168 is positioned in the upper portion of winding 110 (as viewed schematically in FIG. 6) at a point displaced 5/11 of the winding distance along winding 110 from centre tap 166 in the direction of terminal 40, in order to provide 50 volts across primary winding 162 of auxiliary transformer 160.

Accordingly, all parameters have been identified that are necessary to establish the proper position of adjustable tap 168, and from this information and knowing the relationship between the input signal 64 and the output position of tap 168 provided by servomotor 170, the necessary value of servomotor control signal 64 can be computed. Given this value 64 and the known characteristics of the power driver 65, the requisite control signal from microcontroller 74 to power driver 65 can equally be computed. These values, of course, will vary depending upon the electrical characteristics of servomotor 170 and the circuit characteristics of power driver 65.

Third operating condition: $V_{out} < V_{in}$

In the third case, the input voltage is higher across input terminals 40 and 22. Assume that the input voltage is 260 volts whilst the output voltage is required to remain the same as before, namely 240 volts, to supply 10 amperes of current to a presumed output load of 24 ohms.

In this case, it can be computed that as the output power remains the same at 2,400 watts, the input current at an input voltage of 260 volts, will be about 9.2 amperes. Accordingly, there must be a net flow of current across autotransformer 110 of 0.8 amperes from terminal 22 to terminal 40. Again, the voltage differential to be supplied by secondary winding 164 of auxiliary transformer 160 is 20 volts, but this time the voltage to be supplied by winding 164 is of polarity opposite to the polarity established for the second case discussed above. The current draw computed in the same way as previously will be 4 amperes through the primary winding 162 of auxiliary transformer 160; the combined current flow through the portion of autotransformer 110 between centre tap 166 and variable tap 168 (which, in this third case, will necessarily be positioned between neutral terminal 22 and center tap 166 along the lower portion of autotransformer winding 110 as viewed schematically in FIG. 6) will be a net 3.2 amperes.

The computations proceed as in the second case to establish the lengthwise physical positioning of variable tap 168 along the "lower" half winding of autotransformer 110. Knowing the characteristics of servomotor 170 and power driver 65, the requisite control signals can be established to be provided by microcontroller 74 and power driver 65 respectively.

Fourth operating condition: $V_{out} < V_{in}$; $V_{out}$ <rated full-power output voltage Assume that input voltage is 240 volts and that load power is to be reduced by reducing the output voltage $V_{out}$ to 200 volts. In such case, the 24-ohm load will be provided with output power of 1666 watts and will require a current of 8.33 amperes. The voltage differential to be supplied by secondary winding 164 of auxiliary transformer 160 is 40 volts, so at a 2.5 turns ratio, a voltage differential of 100 volts must be supplied by the primary winding 162 of auxiliary transformer 160 (the voltage will be in opposition to the input voltage $V_{in}$). The current draw computed in the same way as previously (8.33/2.5) will be 3.33 amperes through the primary winding 162 of auxiliary transformer 160. The combined current flow through the portion of autotransformer 110 between centre tap 166 and variable tap 168 (which, in this fourth case, will necessarily be positioned between neutral terminal 22 and centre tap 166 along the lower portion of autotransformer winding 110 as viewed schematically in FIG. 6) will be a net 1.39 amperes, 6.96 amperes being supplied by the input to the autotransformer 110.

While a number of embodiments of various circuit configurations in conformity with the invention have been described and illustrated, the invention is not to be limited to those specific embodiments, but embraces equivalents within the skill of circuit designers. The scope of the invention is as set forth in the appended claims.

For simplification of description, a number of assumptions and omissions have been made in this specification. For example, in the discussion of transformer or autotransformer current and voltage values, no account has been taken of internal losses; transformer efficiency has been assumed to be 100%, which is not possible, but need not be specially considered in the context of any given point under discussion. Such assumptions and omissions are conventional in discussion of electric circuits of the sort described, and will be recognized as such by those skilled in electric circuit design.

What is claimed is:

1. A power control unit for connection between a source of power and a load, and for control of power supplied to the load, which source when connected to the power control unit provides power to the power control unit at an input voltage, the power control unit comprising:

a power supply circuit connectable to the power source for providing output power at controllably variable output voltage values over a range of output voltage values;

output voltage selection means for setting the output voltage value at which output power is for the time being supplied to the load;

a power supply driver circuit connected to and for driving the power supply circuit to provide output power at an output voltage value for the time being selected; and a controller responsive to the output voltage selection means and coupled to the driver circuit for controlling the driver circuit to drive the power supply circuit to supply power at a set high voltage to the load for a period of time $T_{Hi}$ starting upon the occurrence of a high-power start condition and ending upon the occurrence of a high-power end condition, and to drive the power supply circuit to supply power at a set low voltage to the load for a later period of time $T_{Lo}$ starting upon the occurrence of a low-power start condition and ending upon the occurrence of a low-power end condition, the controller during a transition period following time period $T_{Hi}$ and preceding time period $T_{Lo}$ controlling the driver circuit to drive the power supply circuit so as to provide a series of selected output voltage values at which the power supply circuit provides output power to the load, said series of selected output voltage values diminishing controllably from the set high output voltage to the set low output voltage in accordance with selected characteristics of the load.

2. The power control unit of claim 1, wherein the power supply circuit includes an autotransformer whose output is supplied to the load and whose output voltage level is variable in response to the driver circuit.

3. The power control unit of claim 2, wherein the power supply circuit includes a compensating transformer whose secondary winding is connected in series with the load and whose primary winding is connected between the center tap of the autotransformer and a variable tap on the autotransformer winding so that the secondary winding voltage is added to the output voltage of the autotransformer to constitute the output voltage level for supply to the load.

4. The power control unit of claim 3, wherein the driver circuit includes a servomotor connected to the variable tap on the autotransformer winding and responsive to the controller, and wherein the voltage applied to the primary winding of the compensating transformer is taken from the variable tap whose position on the autotransformer winding is controlled by the servomotor in response to the controller.

5. The power control unit of claim 2, wherein the winding of the autotransformer is tapped at a first output tap providing the high output voltage level and is tapped at a second output tap providing the low output voltage level, and wherein the driver circuit comprises two pairs of inverse parallel-connected silicon-controlled rectifiers, each pair connected between a discrete tap and a first output terminal for connection to a terminal of the load; the silicon-controlled rectifiers being responsive to control by gate signals provided by the controller so as to supply output current to the load at controlled output voltage levels from the high to the low output voltage levels and any set transitional output voltage levels.

6. The power control unit of claim 5, wherein one input terminal of the autotransformer is located at a tap positioned between the said output taps, and the other input terminal of the autotransformer is connected to the zero voltage point of its winding and to a second output terminal for connection to the other terminal of the load.

7. The power control unit of claim 2, wherein the winding of the autotransformer is tapped separately at a first output tap corresponding to the high output voltage level, a second output tap corresponding to the low output voltage level, and at least one tap intermediate the first and second taps and corresponding to a transitional output voltage level intermediate the high output voltage level and the low output voltage level, and wherein the driver circuit comprises a set of triacs, each such triac being connected between a discrete tap and the load, the triacs individually responsive to control by gate signals provided by the controller so as to selectably supply output current to the load at a selected one of the high, the low, and the transitional output voltage levels.

8. The power control unit of claim 1, wherein the controller includes a microcontroller.

9. The power control unit of claim 1, wherein the driver circuit is integral with the power supply circuit.

10. The power control unit of claim 2, selected for use with a load constituting a bank of luminaires physically spaced from one another.

11. The power control unit of claim 10, remotely connectable to the luminaires, thereby affording at a single location remote control of the bank of luminaires.

12. The power control unit of claim 11, selectedly providing said stepwise reduction of voltage and consequent stepwise reduction in power supplied to the luminaires so as to provide sequential stepwise reductions in illumination by the luminaires, each of which stepwise reductions in illumination is substantially imperceptible to the human eye.

13. The power control unit of claim 2, wherein the controller in operation provides a sequence of control signals to the driver circuit to cause the driver circuit to set the high output voltage level so as to supply power at the set high power setting for the period of time $T_{Hi}$, to set the low output voltage level so as to supply power to the load at the set low power for the period of time $T_{Lo}$, and to set the series of diminishing output voltage levels during the transition period.

14. A power control unit as defined in claim 13, wherein the driver circuit in response to the controller sets the high and low output voltages at times and at values determined by reference inputs to the controller.

15. A power control unit as defined in claim 14, wherein the output voltage selection means is incorporated into software to which the controller responds.

16. The power control unit of claim 2, wherein the controller includes a microcontroller.

17. The power control unit of claim 2, wherein the driver circuit is integral with the power supply circuit.

18. For supplying a load that is unstable or inoperative or that will not operate normally if load supply voltage suddenly declines, the power control unit of claim 1 wherein during the transition period, the controller controls the driver circuit to select a series of stepwise reduced output voltage levels at which the power supply circuit provides output power, within limits on each step of which the load is tolerant.

19. The power control unit of claim 18, wherein the load becomes unstable or inoperative or will not operate normally if load supply voltage drops by more than a specified percentage of the immediately preceding value of the load supply voltage, and wherein each stepwise reduction in output voltage level is selected to be less than the specified percentage of the immediately preceding output voltage as modified by a selected safety factor or margin of error.

20. The power control unit of claim 19, additionally including a sensor of supply current to the load, and wherein the controller is responsive to the supply current to the load and during the transition period provides the next succeeding stepped output voltage level reduction when the supply current to the load has stabilized.

21. The power control unit of claim 20, wherein the $T_{Hi}$ and $T_{Lo}$ time periods are recurrent.

22. The power control unit of claim 21, wherein the $T_{Hi}$ and $T_{Lo}$, time periods are diurnally recurrent.

23. The power control unit of claim 22, wherein the power supply circuit includes an autotransformer whose output is supplied to the load and whose output voltage level is variable in response to the driver circuit.

24. The power control unit of claim 23, wherein the power supply circuit includes a compensating transformer whose secondary winding is connected in series with the load and whose primary winding is connected between the center tap of the autotransformer and a variable tap on the autotransformer winding so that the secondary winding voltage is added to the output voltage of the autotransformer to constitute the output voltage level for supply to the load.

25. The power control unit of claim 24, wherein the driver circuit includes a servomotor connected to the variable tap on the autotransformer winding and responsive to the controller, and wherein the voltage applied to the primary winding of the compensating transformer is taken from the variable tap whose position on the autotransformer winding is controlled by the servomotor in response to the controller.

26. A power control unit for connection between a source of power and a load, for control of power supplied to the load, which source when connected to the power control unit provides current to the power control unit at an input voltage level, the power control unit comprising:

an autotransformer connectable to the power source, the autotransformer having a winding tapped at a first output tap for providing a high output voltage level and at a second output tap for providing a low output voltage level, an input tap positioned between the said output taps and connected to a first input terminal for connection to the power source, and the zero voltage point of the winding connected to a second input terminal for connection to the power source and to a first load connection terminal;

two pairs of inverse parallel silicon-controlled rectifiers, one pair connected between the first output tap and a second load connection terminal and the other pair connected between the second output tap and the second load connection terminal;

a controller connected to the gates of the silicon-controlled rectifiers for controlling the silicon-controlled rectifiers to set the output voltage level at which the output current is for the time being supplied to the load, the controller controlling the silicon-controlled rectifiers to set a high output voltage level so as to supply power at a set high power setting for a period of time $T_{Hi}$ starting upon the occurrence of a high power start condition and ending upon the occurrence of a high power end condition and to set a low output voltage level so as to supply power to the load at a set low power for a later period of time $T_{lo}$ starting upon the occurrence of a low power start condition and ending upon the occurrence of a low power end condition; and a sensor of current supplied to the load, the controller during a transition period following time period $T_{Hi}$ and preceding time period $T_{Lo}$ controlling the gates of the silicon-controlled rectifiers to set a series of transitional output voltage levels diminishing controllably from the set high output voltage level to the set low output voltage level in a series of stepwise decreasing output voltage levels, each stepwise reduction of less than the specified percentage, and each stepwise reduction applied when the current supplied to the load has stabilized.

27. The power control unit of claim 26, wherein the $T_{Hi}$ and $T_{Lo}$ time periods are diurnally recurrent.

28. The power control unit of claim 26, wherein the controller includes a microcontroller.

29. The power control unit of claim 26, wherein the load constitutes a bank of luminaires physically spaced from one another.

30. The power control unit of claim 29, remotely connectable to the luminaires, thereby affording at a single location remote control of the bank of luminaires.

31. The power control unit of claim 30, selectably providing said stepwise reduction of voltage and consequent stepwise reduction in power supplied to the luminaires so as to provide sequential stepwise reductions in illumination by the luminaires, each of which stepwise reductions in illumination is substantially imperceptible to the human eye.

32. A power control unit for connection between a source of power and a load, for control of power supplied to the load, which source when connected to the power control unit provides current to the power control unit at an input voltage level, the power control unit comprising:

an autotransformer connectable to the power source, the autotransformer having a winding tapped at discrete first and second input taps, an output tap positioned between the said input taps and connected to a first load connection terminal, and the zero voltage point of the winding connected to a first input terminal for connection to the power source and to a second load connection terminal;

two pairs of inverse parallel silicon-controlled rectifiers, one pair connected between the first input tap and a second input terminal for connection to the power source and the other pair connected between the second input tap and the second input terminal for connection to the power source;

a controller connected to the gates of the silicon-controlled rectifiers for controlling the silicon-controlled rectifiers to set the output voltage level at which the output current is for the time being supplied to the load, the controller controlling the silicon-controlled rectifiers to set a high output voltage level so as to supply power at a set high power setting for a period of time $T_{Hi}$ starting upon the occurrence of a high power start condition and ending upon the occurrence of a high power end condition and to set a low output voltage level so as to supply power to the load at a set low power for a later period of time $T_{Lo}$ starting upon the occurrence of a low power start condition and ending upon the occurrence of a low power end condition; and a sensor of current supplied to the load, the controller during a transition period following time period $T_{Hi}$ and preceding time period $T_{Lo}$ controlling the gates of the silicon-controlled rectifiers to set a series of transitional output voltage levels diminishing controllably from the set high output voltage level to the set low output voltage level in a series of stepwise decreasing output voltage levels, each stepwise reduction of less than the specified percentage, and each stepwise reduction applied when the current supplied to the load has stabilized.

33. The power control unit of claim 32, wherein the $T_{Hi}$ and $T_{Lo}$ time periods are diurnally recurrent.

34. The power control unit of claim 32, wherein the controller includes a microcontroller.

35. A power control unit for connection between a source of power and a load, for control of power supplied to the load, which source when connected to the power control unit provides current to the power control unit at an input voltage level, the power control unit comprising:

an autotransformer having a winding separately tapped at
a first output tap corresponding to the high output voltage level,
a second output tap corresponding to the low output voltage level,
a plurality of taps intermediate the first and second output taps and corresponding to transitional output voltage levels intermediate the high output voltage level and the low output voltage level, and
an input tap positioned between the first output tap and the second output tap and connected to a first input terminal for connection to the power source, the zero voltage point of the winding connected to a second input terminal for connection to the power source and to a first load connection terminal;

a set of triacs, each triac connected between a discrete tap and a second load connection terminal, the triacs individually responsive to control by gate signals provided by the controller so as to selectably supply output current to the load at a selected one of the high, the low, and the transitional output voltage levels;

a controller for controlling the set of triacs to set the output voltage level at which the output current is for the time being supplied to the load, the controller controlling the triacs to set a high output voltage level so as to supply power at a set high power setting for a period of time $T_{Hi}$ starting upon the occurrence of a high power start condition and ending upon the occurrence of a high power end condition and to set a low output voltage level so as to supply power to the load at a set low power for a later period of time $T_{Lo}$ starting upon the occurrence of a low power start condition and ending upon the occurrence of a low power end condition; and a sensor of current supplied to the load, the controller during a transition period following time period $T_{Hi}$ and preceding time period $T_{Lo}$, controlling the set of triacs to set a series of output voltage levels diminishing controllably from the set high output voltage level to the set low output voltage level in a series of stepwise decreasing output voltage levels, each stepwise reduction of less than the specified percentage, and each stepwise reduction applied when the current supplied to the load has stabilized.

36. The power control unit of claim 35, wherein the $T_{Hi}$ and $T_{Lo}$ time periods are diurnally recurrent.

37. The power control unit of claim 35, wherein the controller includes a microcontroller.

* * * * *